United States Patent
Tsukagoshi et al.

(10) Patent No.: US 6,530,411 B1
(45) Date of Patent: Mar. 11, 2003

(54) PNEUMATIC TIRES

(75) Inventors: Tetsuhito Tsukagoshi, Iruma (JP); Takeshi Watanabe, Kodaira (JP); Kuninobu Kadota, Higashimurayama (JP); Yuichiro Ogawa, Fuchu (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/493,116

(22) Filed: Jan. 28, 2000

(30) Foreign Application Priority Data

| Jan. 28, 1999 | (JP) | 11-019847 |
| Feb. 5, 1999 | (JP) | 11-028762 |
| Apr. 23, 1999 | (JP) | 11-116207 |
| Apr. 23, 1999 | (JP) | 11-116442 |
| Apr. 26, 1999 | (JP) | 11-117514 |

(51) Int. Cl.$^7$ .............................................. B60C 15/00
(52) U.S. Cl. ...................................... 152/552; 152/553
(58) Field of Search .................................. 152/552, 554, 152/543, 539, 546, 547, 549, 553, 558, 559

(56) References Cited

U.S. PATENT DOCUMENTS

| 2,537,632 A | | 1/1951 | Mansfield et al. | |
| 3,301,303 A | | 1/1967 | Travers | |
| 3,935,894 A | | 2/1976 | Pouillox | |
| 3,964,532 A | * | 6/1976 | Harrington | 152/552 |
| 4,794,967 A | * | 1/1989 | Charvet | 152/554 |
| 4,854,361 A | * | 8/1989 | Gasowski et al. | 152/552 |
| 4,922,985 A | * | 5/1990 | Gasowski et al. | 152/543 |
| 5,626,698 A | * | 5/1997 | Tsuruta et al. | 152/552 |
| 5,759,315 A | * | 6/1998 | Suzuki et al. | 152/552 |
| 5,820,710 A | * | 10/1998 | Behnsen et al. | 152/552 |
| 5,979,528 A | * | 11/1999 | Miyazono | 152/543 |
| 6,044,885 A | * | 4/2000 | Kato | 152/540 |
| 6,129,128 A | * | 10/2000 | Fukumoto | 152/552 |
| 6,279,635 B1 | * | 8/2001 | Miyazono | 152/539 |
| 6,345,657 B1 | * | 2/2002 | Kato | 152/548 |
| 6,354,351 B1 | * | 3/2002 | Miyazono | 152/543 |

FOREIGN PATENT DOCUMENTS

| CA | 1283343 | 4/1991 |
| DE | 2936337 | 3/1981 |
| EP | 0467277 A1 | 1/1992 |
| EP | 467277 | 1/1992 |
| EP | 0778161 | 6/1997 |
| FR | 1328752 | 12/1963 |
| JP | 57-191104 | 11/1982 |
| JP | 56-10586 A | 6/1983 |
| JP | 62-50207 | 3/1987 |
| JP | 4-250029 | 9/1992 |
| JP | 6-156022 | 6/1994 |
| JP | 8-40026 | 2/1996 |
| JP | 10-24711 | 1/1998 |
| JP | 10-193924 | 7/1998 |
| WO | 99/48708 | 9/1999 |

* cited by examiner

Primary Examiner—S. Joseph Morano
Assistant Examiner—Long Bao Nguyen
(74) Attorney, Agent, or Firm—Sughrue Mion, PLLC

(57) ABSTRACT

A pneumatic tire comprises a carcass comprised of at least one carcass ply containing a steel cord(s) arranged at a cord angle of 70–90° with respect to an equatorial plane of the tire and toroidally extending between a pair of bead cores and turned up around the bead core inward or outward in a radial direction to form a turnup portion, wherein a wrap part wrapping on a peripheral face of the bead core therealong is formed in the turnup portion of the carcass ply.

13 Claims, 26 Drawing Sheets

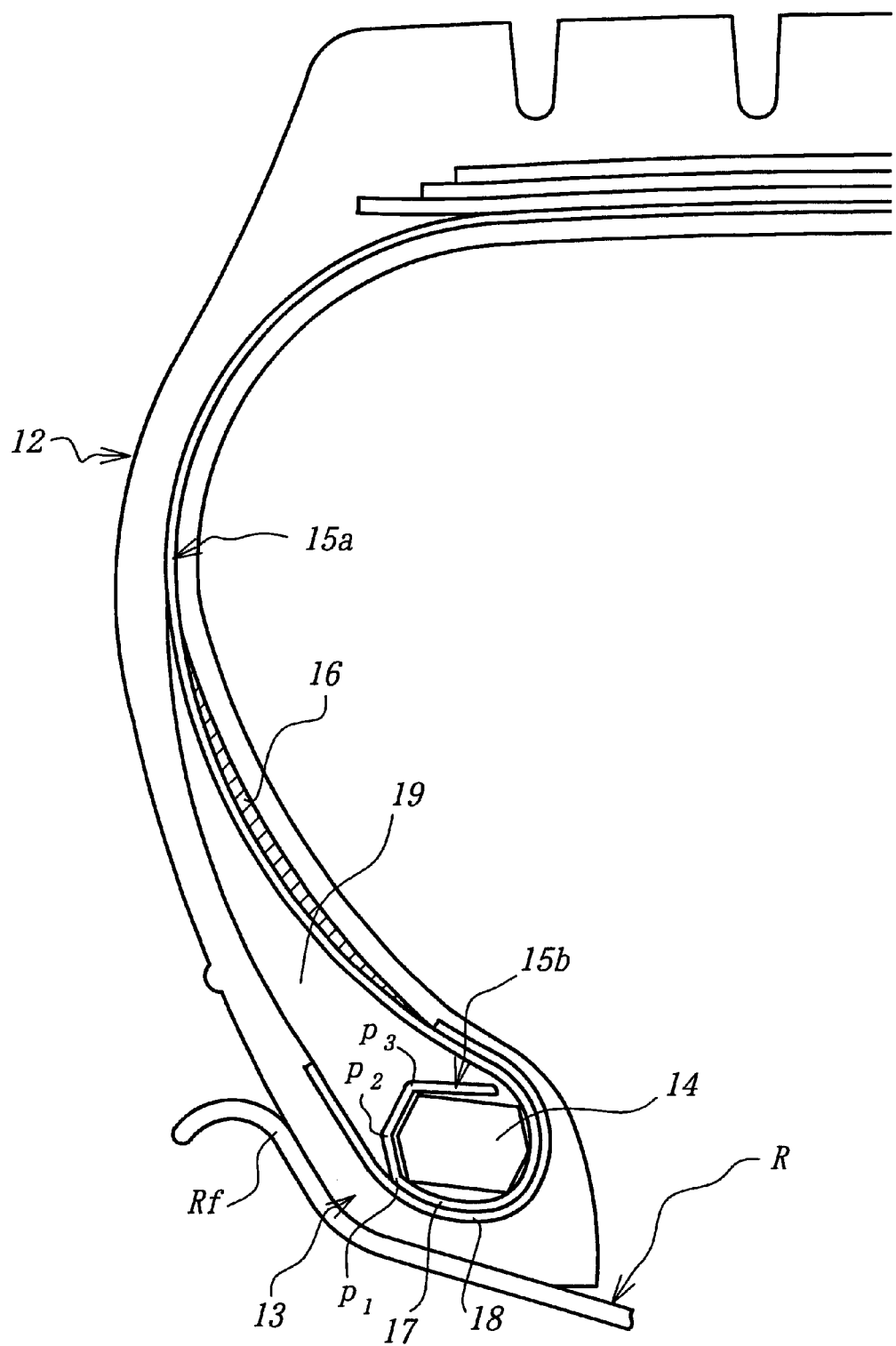

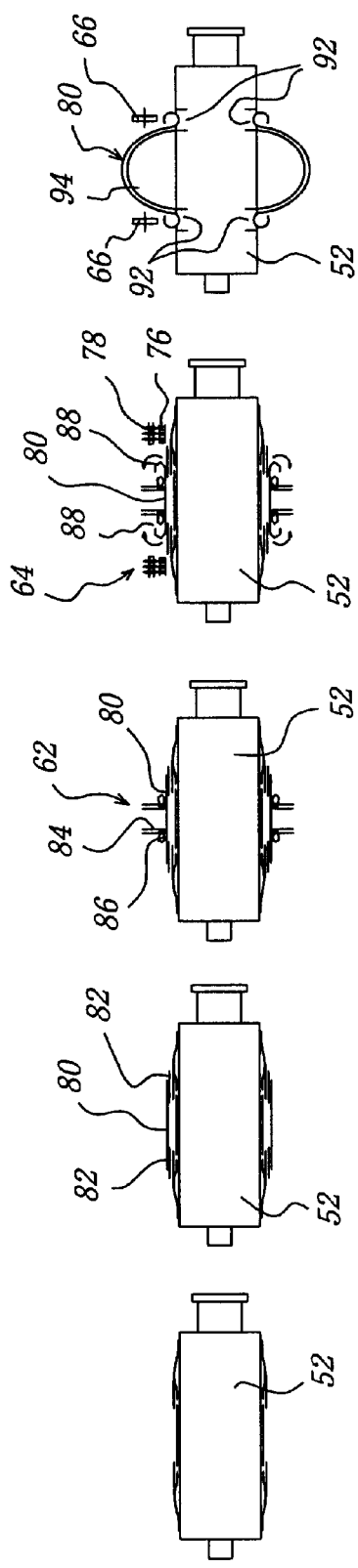

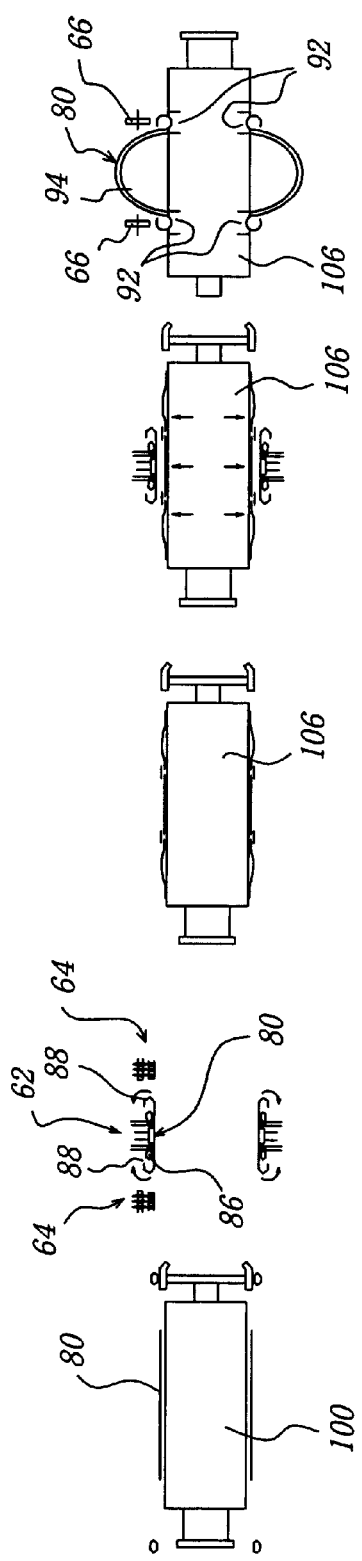

($t_2 = \alpha \times t_1$)

$\longrightarrow L_p = (mm)$

PNEUMATIC TIRES

BACKGROUND OF THE INVENTION

1. Field of the Invention

This invention relates to a pneumatic tire, and more particularly to an improvement of a bead portion structure in a heavy duty pneumatic radial tire capable of effectively preventing the pulling-out of carcass ply cord, occurrence of separation failure at turnup portion of carcass ply and the like to improve the durability. Further, it relates to a method of manufacturing such a pneumatic tire as well as a carcass band bending apparatus used therefor and a tire manufacturing apparatus.

2. Description of Related Art

In the conventional heavy duty pneumatic radial tire, the carcass ply is toroidally extended between a pair of bead cores in bead portions and turned up around the bead core from an inside of the tire toward an outside thereof in a radial direction and the resulting turnup portion is embedded and fixed in rubber in order to prevent the pulling-out of the carcass ply cord during the running of the tire under loading.

FIGS. 1a and 1b show diagrammatically section views of typical embodiments of the bead portion in the conventional heavy duty pneumatic radial tire, respectively. In the illustrated embodiment of FIG. 1a, an outer end of a turnup portion 1a of a carcass ply 1 wound around a bead core 3 is located outward from an outer end of a wire chafer 2 in a radial direction of the tire. In the illustrated embodiment of FIG. 1b, the outer end of the wire chafer 2 is located outward from the outer end of the turnup portion 1a of the carcass ply 1 in the radial direction. Moreover, numeral 4 is a bead filler.

In such conventional bead portion structures, however, the difference of stiffness is produced between inside and outside in the radial direction of the tire on the border of the position of the outer turnup end of the carcass ply 1 or the outer end of the wire chafer 2, a zone ranging from the bead portion to the sidewall portion is subjected to repetitive deformation during the running of the tire under loading, whereby stress is concentrated at each of the outer ends and in the vicinity thereof and hence it is apt to cause separation failure at the outer end from rubber, which results in the occurrence of crack cr in the bead portion as shown in FIGS. 2a and 2b.

In order to mitigate stress produced at the outer turnup end of the carcass ply 1 or the outer end of the wire chafer 2 and in the vicinity thereof and enhance the stiffness of the bead portion to control the deformation of the bead portion, therefore, there are proposed a method wherein plural organic fiber cord layers (not shown) are circumscribed with the wire chafer 2 around the bead core 3 so as to cover the outer turnup end of the carcass ply 1 or the outer end of the wire chafer 2, a method of increasing an amount of the bead filler 4, particularly hard rubber filler arranged at the outside of the bead core 3 between a main body of the carcass ply 1 and the turnup portion thereof in the radial direction, and the like. According to these methods, however, the heat generating temperature of the bead portion becomes more higher during the running of the tire under loading, which results in the occurrence of separation failure even at the outer end of the organic fiber cord layer in addition to the above separation failure, and also the tire weight is undesirably increased to lower the productivity of the tire.

When the heavy duty pneumatic radial tire is used several times by recapping after the wearing, there is a further problem that it is impossible to use the tire due to the occurrence of separation failure around the turnup end of the carcass ply subjected to stress concentration in the use over a long time.

As a countermeasure for solving such a problem, there is a technique that the rubber gauge of the bead portion is reduced by forming a recess portion in an outer profile of the bead portion at the radial section of the tire to lower the heat build-up of the bead portion (for example, JP-A-57-191104). In this technique, however, the rubber gauge of the bead portion can not be reduced too much owing to the presence of the turnup portion of the carcass ply, so that the effect of improving the bead portion durability can not be said to be sufficient.

Furthermore, JP-A-10-193924 proposes a technique that the thickness of the bead portion is decreased by extending the turnup portion along the main body of the carcass ply to form a recess portion in the outer profile of the bead portion. In this case, however, shearing strain is caused in an interface between the main body and the turnup portion of the carcass ply is increased by the shearing deformation based on the pushing from the rim flange under loading as the rubber gauge at the outside of the turnup portion is decreased and hence there is caused a problem that separation failure is caused between the carcass ply and rubber located at the outside thereof.

In any case, it is insufficient to prevent the separation failure in the bead portion even by these conventional techniques because the service conditions of the large-size pneumatic radial tire become recently severer with the increase of the recapping number from viewpoints of environmental consideration and economical merit and the bead portion durability is degraded in lower section-profile tires recently used, and hence basic solution for bead portion troubles are not yet obtained.

In the manufacture of the tire as mentioned above, when the winding of the turnup portion of the carcass ply around the peripheral surface of the bead core is carried out by subjecting the ply cords and hence the carcass ply to elastic deformation in the winding direction with, for example, well-known bladder, blade, roll and the like and then sticking the elastic deformed turnup portion onto the peripheral surface of the bead core with rubber, it is difficult to wind the ply cords onto the peripheral surface of the bead core with a high accuracy as is expected. And also, ply cords having a large elastic restoring force such as steel cords, aromatic polyamide cords and so on can not accurately be maintained at the required winding position irrespectively of the ply cord having a small elastic restoring force. In any case, there is a problem that the pulling-out of the ply cord and the separation failure at the turnup end of the carcass ply can not sufficiently be prevented, respectively.

SUMMARY OF THE INVENTION

It is, therefore, an object of the invention to solve the aforementioned problems of the conventional techniques and to provide pneumatic tired, particularly heavy duty pneumatic radial tires capable of effectively preventing the separation failure at outer ends of the carcass ply and wire chafer from rubber and the pulling-out of the carcass ply cord to largely improve the bead portion durability without the increase of the tire weight, the degradation of the tire productivity and the like.

It is another object of the invention to provide a method for the manufacture of the pneumatic tire capable of accurately winding the turnup portion of the carcass ply onto the peripheral surface of the bead core as is expected and surely maintaining the wound posture even when using the ply cord having a large elastic restoring force as well as a carcass band bending apparatus used therefor and a tire manufacturing apparatus.

According to a first aspect of the invention, there is the provision of in a pneumatic tire comprising a carcass comprised of at least one carcass ply containing a steel cord(s) arranged at a cord angle of 70–90° with respect to an equatorial plane of the tire and toroidally extending between a pair of bead cores and turned up around the bead core inward or outward in a radial direction to form a turnup portion, the improvement wherein a wrap part wrapping on a peripheral face of the bead core therealong is formed in the turnup portion of the carcass ply.

In the invention, there are a case that the turnup portion is formed by winding the carcass ply from an inside toward an outside in a widthwise direction of the tire, and a case that the turnup portion is formed by winding the carcass ply from an outside toward an inside in the widthwise direction of the tire.

And also, the carcass ply includes a case that many steel cords are substantially radially arranged side by side, and a case that a single steel cord is turned at a position corresponding to the turnup portion of the carcass ply and extended at a detoured state in the circumferential direction of the tire.

In the pneumatic tire according to the invention, the wrap part wrapping along the peripheral face of the bead core is formed in the turnup portion of the carcass ply, whereby the pulling-out of the carcass ply cord can effectively be prevented without prolonging the turnup portion outward in the radial direction of the tire. And also, the wrap part is located sufficiently adjacent to the bead core having a high stiffness, so that the deformation of a zone in the vicinity of the wrap part during the running of the tire under loading is effectively restrained by the bead core, a rim supporting the bead portion and the like. As a result, there is no fear of concentrating stress in the wrap part and its neighborhood due to the above deformation and hence separation failure at the wrap part and hence the turnup portion is effectively prevented.

In such a tire, at least one plastic deformation region is formed in the wrap part. Such a plastic deformation region can be realized, for example, by providing the wrap part with at least one bent or formed zone of rectangle, curve or the like adaptable to a radially sectional profile shape of the bead core. Since the wrap part is located nearer to the peripheral face of the bead core and more accurately followed thereto by the plastic deformation region, the wrap part can more effectively be restrained by the bead core to further effectively prevent the pulling-out of the carcass ply cord and separation failure of the turnup portion.

The plastic deformation region is preferable to be previously formed in a portion of the carcass ply corresponding to the warp part prior to the winding of the carcass ply around the bead core. Thus, the plastic deformation can always and accurately be conducted as it is expected and hence the above effect can be more enhanced.

In a preferable embodiment of the first aspect of the invention, at least the wrap part of the turnup portion is interposed between the bead core and a bead filler, whereby the wrap part can be closed to the bead core through the bead filler to more advantageously prevent the pulling-out of the carcass ply cord and separation failure of the wrap part.

In another preferable embodiment of the first aspect of the invention, the wrap part is extended along the peripheral face of the bead core over a half periphery of the sectional profile of the bead core. In general, the bead core has a polygonal shape, a circular shape or the like as the radially sectional profile. In any shapes, the aforementioned effect can be more enhanced by extending the wrap part along the bead core over the half periphery of the sectional profile.

In the other preferable embodiment of the first aspect of the invention, an outer end of the turnup portion is located inward from an outer circumferential edge of the bead portion at the contact region with the rim flange in the radial direction of the tire. The term "contact region of the bead portion with the rim flange" used herein means a maximum contact region of the bead portion with the rim flange during the running of the tire at a maximum air pressure under a maximum load.

Thus, when the turnup portion has an outer end region protruding outward from the end of the wrap part in the radial direction, the outer end is strongly held by the rim and can be located in a zone having a very little deformation during the running of the tire under loading, whereby the concentration of stress in the outer end and the neighborhood thereof can effectively be prevented to sufficiently protect the outer end region of the turnup portion against the separation failure.

Particularly, this becomes conspicuous when the end of the wrap part is located inside in the radial direction over a position corresponding to an outer peripheral edge of the bead core embedded in the bead portion at a state of mounting onto the rim in the inflation under the maximum air pressure so as to make longer than a length of the wrap part along the bead core.

Moreover, the above features are particularly effective in pneumatic tires having an aspect ratio of not more than 60%. That is, in the tire having a small aspect ratio, shearing strain in the circumferential direction occupies a large weight rather than compression strain produced in the turnup end of the carcass ply due to the occurrence of internal stress accompanied with the bending deformation of the sidewall portion during the running of the tire under loading as a cause of creating separation failure of the turnup portion, but in the tire according to the invention, the turnup portion is wrapped so as to locate an end of the wrap part in the vicinity of the bead core having a less deformation, whereby the end of the turnup portion is worked together with the main body of the carcass ply and hence shearing strain in the circumferential direction to road surface can advantageously be reduced.

In the first aspect of the invention, it is favorable that the steel cord as the carcass ply cord has a tenacity of 80–300 kgf, preferably 100–180 kgf. When the tenacity is less than 80 kgf, it is difficult to ensure a given tenacity when the carcass ply cord is subjected to plastic deformation to decrease the tenacity by about 10–20%, while when it exceeds 300 kgf, the diameter of the cord becomes too thick and the plastic deformation becomes difficult and it is apt to create injury in the cord through the plastic deformation.

Even in the above tire, it is sometimes apt to cause a permanent set in fatigue of the bead portion, which may cause the cracking at the outside of the bead portion in the recapping or separation failure at a chafer member and hence the bead portion durability may not sufficiently be improved.

Therefore, the inventors have considered that the permanent set of the bead portion can be controlled by taking means for reducing a contact pressure between the bead portion of the tire and the rim when the tire is changed from deflate state to an inflate state and made various studies. As a result, it has been confirmed that the change of a profile of a carcass line located in a region of the bead portion outward from a contact region with a rim flange in the radial direction of the tire is made small when the tire is changed from the deflate state to the inflate state, and particularly the amount of pushing out the bead portion toward the rim flange is made small, and more concretely a displacement (d) of a point X changed from a deflate state to an inflate state is not more than 3 mm as measured at a section in the widthwise direction of the tire, wherein X is an arbitrary point on a carcass line located in a region of the bead portion outward from a contact region with a rim flange at the deflate state when the tire is mounted onto a recommended rim, whereby the contact pressure with the rim flange can be made small to considerably decrease the permanent set of the bead portion.

The position of the point X means an arbitrary point located on the carcass line within a range of ±20 mm centering on an intersect between the carcass line and a normal line drawn from the contact point with the rim flange to the carcass line at the deflate state of the tire. In other words, the point X existing within the above range means that the displacement d is not more than 3 mm.

And also, the displacement d means a displacing amount when the point X on the carcass line at the deflate state moves to a point X' at an inflate state (distance between point X and point X').

The term "deflate state" used herein means that the tire is at a self-supportable state on the rim under no load after air is discharged from the inside of the tire or concretely at a state under an air pressure of 0.5–1.0 kgf/cm$^2$. And also, the term "inflate state" used herein means that the tire is at a state of inflating at an air pressure corresponding to a maximum air pressure under no load.

Further, the term "maximum air pressure" used herein means an air pressure corresponding to a maximum load of a single wheel having an approved size described in the following standard (maximum load capacity), and the term "recommended rim" used herein means a recommended rim (or approved rim) described in the following standard.

The standard is defined by Year Book of The Tire and Rim Association Inc. in USA, Standard Manual of The European Tire and Rim Technical Organization in Europe, and Year Book of JATMA in Japan, respectively.

Moreover, the term "carcass line" used herein means a line passing through a thickness center of the carcass ply constituting the carcass body at a section of the tire in the widthwise direction. Concretely, when the carcass body is comprised of one ply, the carcass line is a line passing through the center of the cord embedded in the ply, while when the carcass body is comprised of two or more plies, the carcass line is a line passing through a thickness center of the laminated plies.

In FIG. 3 is shown an example of results measured on contact pressure to the rim flange in tires having different displacements d (i.e. pushing-out amount of bead portion) when the tire is changed from the deflate state to the inflate state.

As seen from FIG. 3, when the displacement d exceeds 3 mm, the contact pressure rapidly increases. In the usual tire, the displacement d at the inflate state is generally within a range of 4–6 mm.

In order to decrease the displacement d, it is favorable to satisfy a relation of $R_0<2H$, preferably $R_0<H$ when a radius of curvature of the carcass line at the point X is $R_0$ and a section height of the tire is H at the deflate state.

In case of $R_0<H$, the pushing-out amount of the bead portion can be zero or the bead portion can be deformed (recessed) in a direction opposite to the pushing-out direction, whereby the contact pressure to the rim flange can be more reduced.

In a still further preferable embodiment of the first aspect of the invention, a rubber layer controlling shearing strain is arranged between a bead filler and a bead portion reinforcing layer located at an outside of the tire, whereby shearing strain is suppressed at the turnup end portion of the carcass ply.

In this case, the rubber layer has a hardness middle between hardness of the bead filler and hardness of a sidewall rubber constituting a sidewall portion together with the bead filler. And also, a ratio of the hardness of the bead filler to the hardness of the sidewall rubber is not less than 1.4 times. Thus, the difference of stiffness between the bead filler and the sidewall rubber can be made small and also excessively interlaminar shearing strain is suppressed between the rubber layer and the bead portion reinforcing layer to avoid the occurrence of separation failure from an end portion of the bead portion reinforcing layer. Moreover, even when the number of the reinforcing layers is increased for preventing the deformation in the bead portion, stress does not concentrate in the vicinity of the end of such a reinforcing layer, so that the shearing strain resulting in the occurrence of separation failure is decreased.

When the thickness of the rubber layer is $t_2$ and the thickness of the bead portion reinforcing layer is $t_1$, it is favorable to satisfy a relation of $0.3t_1 \leq t_2 \leq 5t_1$. Thus, the deformation of the bead portion can be prevented without the concentration of shearing strain in the end portion of the bead portion reinforcing layer.

Furthermore, it is favorable that an end of the rubber layer is located at a position corresponding to an upper part of the bead core, preferably so as to contact with the turnup portion of the carcass ply and the other end thereof is extended along the bead portion reinforcing layer and protruded from an end of the reinforcing layer by 30 mm at maximum. Thus, it is possible to avoid the concentration of shearing strain in the turnup end of the carcass ply and the end of the reinforcing layer.

In the other preferable embodiment of the first aspect of the invention, a recess zone is formed in an outer profile of the bead portion located inward from a position of a maximum tire width in the radial direction of the tire at a radial section of the tire. Thus, the heat build-up of the bead portion during the running of the tire under loading is decreased by the formation of the recess zone, whereby the bead portion durability can be largely improved.

In the tire having the recess zone in its bead portion, a rubber gauge in a region ranging outward from a position corresponding to 1.8 times a maximum bead portion width located from a position of a nominal diameter of a rim flange in the radial direction of the tire to the position of the maximum tire width is substantially equal to a rubber gauge at the position of the maximum tire width. That is, the rubber gauge T (distance from the cord in the carcass ply to the outer profile of the tire) in a region ranging outward from a position corresponding to 1.8 times the maximum bead portion width located from the position of the nominal diameter of the rim flange in the radial direction of the tire to the position of the maximum tire width (rubber located at the outside of the carcass ply) is made substantially equal to the rubber gauge at the position of the maximum tire width (0.7–1.3 times the thickness at the position of the maximum tire width), while the rubber gauge in a region ranging inward from the position corresponding to 1.8 times the maximum bead portion width in the radial direction of the tire to a position of the bead core is gradually increased (or the depth of the recess zone is gradually decreased).

In general, the sidewall rubber is enough to have a rubber gauge required for preventing external injury in the vicinity of the position of the maximum tire width and is set to a value of rubber gauge thinner than that in the bead portion or the like. Even in the bead portion, it is desirable to make the rubber gauge thin considering only the heat build-up. On the other hand, the bead core is necessary to have a certain stiffness for fixing the tire onto the rim. If the rubber gauge is made thin up to the vicinity of the bead core likewise the case at the position of the maximum tire width, the bending deformation of the bead portion concentrates in the vicinity of the bead core to cause the concentration of strain in the rubber of the bead portion near to the bead core and hence there is caused a problem that crack is created at the outer surface of the tire in the vicinity of the bead core. However, such a problem is solved by the relation of rubber gauge as mentioned above in the invention.

Furthermore, it is favorable that the recess zone is arranged outward from an alienation point between the outer surface of the bead portion and the rim flange in the radial direction of the tire when the tire is mounted onto a recommended rim and stated at a maximum air pressure under a maximum load. If the recess zone is formed in a region of the bead portion contacting with the rim flange under loading, an amount of a space between the outer surface of the bead portion and the rim flange under an inflation of the air pressure is increased to increase the amount of the bending deformation under loading in the vicinity of such a region, which badly affects the bead portion durability. This problem is solved by arranging the recess zone outward from the alienation point between the outer surface of the bead portion and the rim flange under loading in the radial direction as mentioned above.

Moreover, when the width of the bead portion is violently decreased as compared with the maximum bead portion width in the region contacting with the rim flange under loading, the amount of space between the outer surface of the bead portion and the rim flange increases to increase the fall-down deformation of the bead portion. For this end, it is favorable that a thickness $W_P$ of the bead portion at the alienation point P between the outer surface of the bead portion and the rim flange at the inflation state of the maximum air pressure under the maximum load after the mounting onto the recommended rim satisfies a relation of $W_P/W_M \geq 0.9$ when a width of the bead portion passing through a illustrated center of the bead core in parallel to a standard line of the bead portion thickness at the alienation point P is $W_M$.

According to a second aspect of the invention, there is the provision of a method of manufacturing a pneumatic tire, which comprises subjecting a cylindrical carcass band to a forming treatment by bending each end portion of the band in at least one place in an axial direction of a green tire over a full circumference thereof inward or outward in a radial direction of the tire, arranging a ring-shaped bead core on an inside of the bent end portion, toroidally expanding the cylindrical carcass band while locking the bead core, and then joining a belt and a tread onto an outer peripheral side of the carcass band.

According to this method, the previously formed bent end portion is accurately formed in the required position of the cylindrical carcass band in correspondence with the peripheral shape and dimension of the bead core and then the bead core is inserted into the inside of the bent end portion, whereby the bent end portion can accurately be wound around the peripheral surface of the bead core even when the ply cord has a large elastic restoring force as in steel cord. And also, the winding posture can surely be maintained based on the plastic deformation through the previous forming, so that the fear of pulling-out the ply cords is sufficiently removed and also the separation failure of the turnup portion of the carcass ply from rubber can always and surely be prevented.

The bending formation of the end portion of the carcass band can be made inward or outward in the radial direction of the carcass band. In the former case, the end portion of the carcass band is turned up around the bead core from outside toward inside in the widthwise direction of the tile in a product tire. In the latter case, the end portion is turned up from inside toward outside in the widthwise direction of the tire.

Moreover, when there are plural bending positions in this method, the operation of the bending formation is carried out by bending each end portion of the cylindrical carcass band simultaneously at plural positions in the axial direction or in a given order. The simultaneous bending at plural positions is advantageous in view of the operation efficiency unless one of the positions affects the other position and is obstructed by the other position.

In a preferable embodiment of the second aspect of the invention, the bending at the each end portion of the cylindrical carcass band is carried out by relatively displacing a bending means and a cylindrical carcass band in the circumferential direction of the cylindrical carcass band. In this case, a bending means relatively displacing to a circumferential direction of a carcass band drum and hence a circumferential direction of a cylindrical shaped carcass band formed on the drum is merely added on the existing carcass band drum, and the cylindrical carcass band is subjected to the required bending work by putting the cylindrical carcass band from inner and outer circumferential sides thereof through the bending means, whereby the bent portion can surely be formed in the cylindrical carcass band being structurally soft with a less equipment cost as is expected.

In another preferable embodiment of the second aspect of the invention, the arrangement of the bead core at the inside of the bent end portion is carried out by subjecting the bent end portion to elastic deformation in an opening direction. When the cross sectional shape of the bent end portion is polygonal or the like and it is impossible to insert the bead core into the inside of the bent end portion at a state of bent formation, the insertion of the bead core is carried out at a state of open-deforming at an elastic zone, whereby the bead core can accurately be arranged in the required position and hence the proper winding of the bent end portion around the peripheral surface of the bead core can surely be realized.

In the other preferable embodiment of the second aspect of the invention, the bend end portion is subjected to stitching at a state of toroidally expanding the cylindrical carcass band while locking the bead core. In this case, the bend end portion can sufficiently be pressed onto the peripheral surface of the bead core by the stitching together with the pushing of air from both members at a state of sufficiently approaching the extending form of the carcass band to that of the green tire, whereby the expected effect can be more enhanced.

The bending formation of the end portion in the cylindrical carcass band can naturally be carried out even when the carcass band is comprised of organic fiber cords having a large elastic restoring force such as aromatic polyamide cords and the like, but the plastic deformation for the required bending formation can be carried out with a more higher accuracy when the carcass band is comprised of steel cords. And also, it is advantageous to develop the higher cord tenacity even when the plastic deformation is carried out.

According to a third aspect of the invention, there is the provision of an apparatus for bending a carcass band for use in the manufacture of the pneumatic tire, comprising a shaft-shaped member provided with an annular groove supporting an end portion of a cylindrical carcass band from an inner or outer circumferential side thereof, and a disc-shaped member located in a position corresponding to the annular groove and pushing the cylindrical carcass band into the annular groove.

In this bending apparatus, the cylindrical carcass band is putted between the shaft-shaped member and the disc-shaped member and pushed into the annular groove at a given force, so that the bending formation can simply, easily and accurately be carried out at a required position of the cylindrical carcass band in its axial direction by a simple and small apparatus independently separated from a carcass band drum forming the cylindrical carcass band. Such a bending formation can properly be carried out over a full circumference of the carcass band having a soft structure without disturbing the cord arrangement or the like in the carcass band, for example, by rotating at least one of the shaft-shaped member and the disc-shaped member to relatively move the bending apparatus to the cylindrical carcass band in the circumferential direction thereof, or by rotating the cylindrical carcass band to the bending apparatus.

In such a bending apparatus, when a plurality of annular grooves are formed on the shaft-shaped member at given intervals and disc-shaped members in accordance with the number of the annular grooves are arranged side by side in the same axial line, the bending formation can simultaneously be carried out in plural positions of the cylindrical carcass band separated at given intervals in its axial direction by the one action of the apparatus, whereby the working efficiency can largely be increased.

Moreover, the relative movement between the bending apparatus and the cylindrical carcass band in the circumferential direction can be carried out by connecting at least one of the cylindrical carcass band, shaft-shaped member and disc-shaped member to a rotation driving means, or by rotating at least one of the shaft-shaped member and the disc-shaped member on its axis and arranging a driving means for revolving both the members around the circumference of the cylindrical carcass band.

According to a fourth aspect of the invention, there is the provision of an apparatus for manufacturing a pneumatic tire, comprising a carcass band drum forming a cylindrical carcass band, a carcass band bending apparatus for subjecting an end portion of the cylindrical carcass band located on the carcass band drum to bending formation, a bead setter for arranging a ring-shaped bead core inside the bent end portion of the cylindrical carcass band, a bead lock for supporting the bead core arranged on the bend end portion from its inner peripheral side, and a shaping means for toroidally expanding the cylindrical carcass band.

According to this manufacturing apparatus, the above manufacturing method can easily be realized by adding the carcass band bending apparatus to the existing tire building apparatus, somewhat improving the bead setter and the like.

In this case, the shaping means can be added to the carcass band drum. Thus, the installation cost can be controlled to a low level by decreasing the number of the drums and also the step of transporting the cylindrical carcass band or the like can be made useless.

Alternatively, the shaping drum provided with the shaping means is disposed irrespectively of the carcass band drum and a transportation means for transporting the formed cylindrical carcass band into the shaping drum, and the carcass band bending apparatus and the bead setter can be added to the transportation means.

BRIEF DESCRIPTION OF THE DRAWINGS

The invention will be described with reference to the accompanying drawings, wherein:

FIG. 11 is a diagrammatically left-half section view of an eighth embodiment of the pneumatic tire according to the invention;

FIGS. 24a to 24e are block diagrams illustrating the manufacturing steps of the apparatus shown in FIG. 20;

FIGS. 29a to 29e are block diagrams illustrating the manufacturing steps of the apparatus shown in FIG. 28;

DESCRIPTION OF PREFERRED EMBODIMENTS

Figure 4:
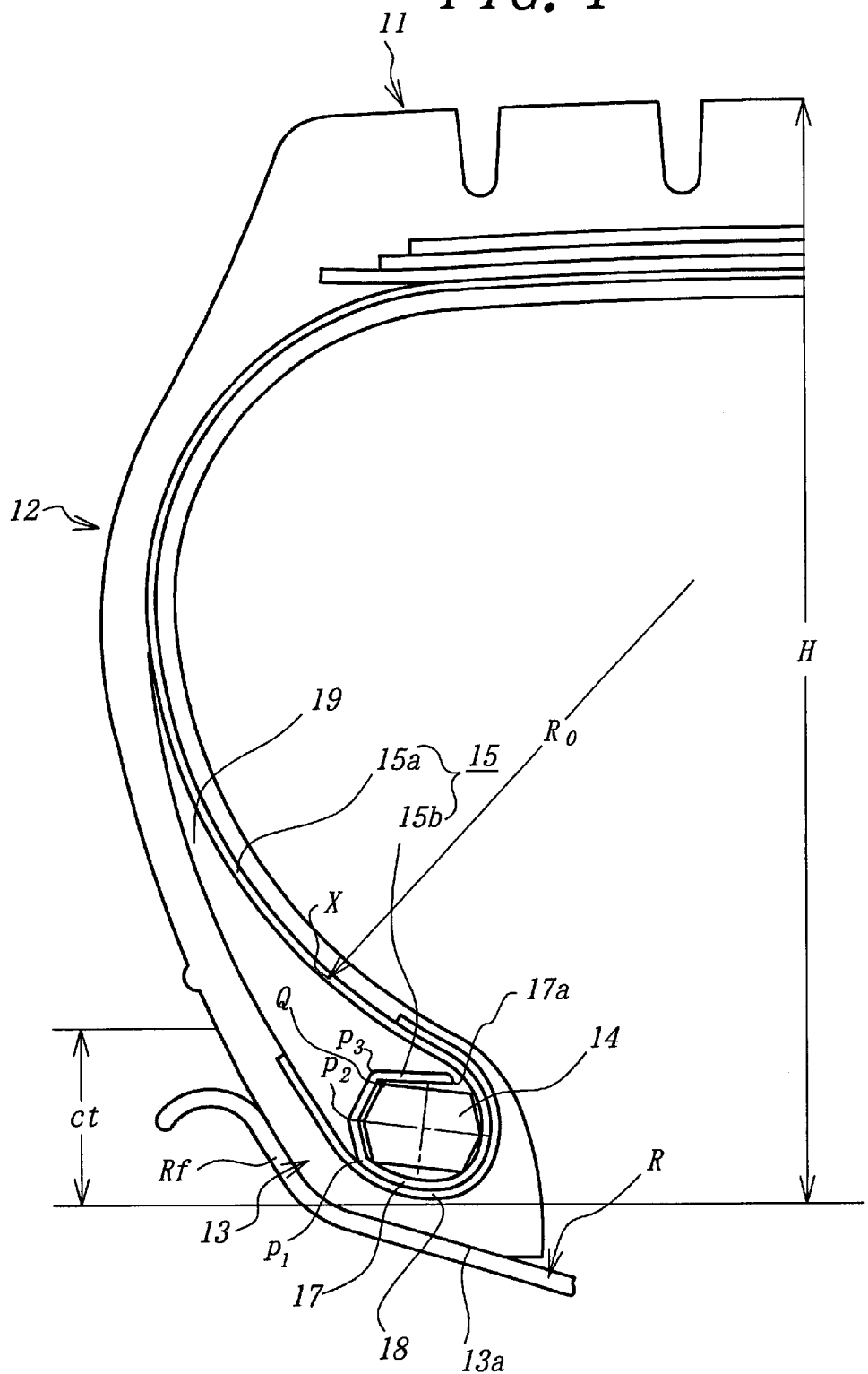
FIG. 4 is a diagrammatically left-half section view of a first embodiment of the pneumatic tire according to the invention.
Figure 5:
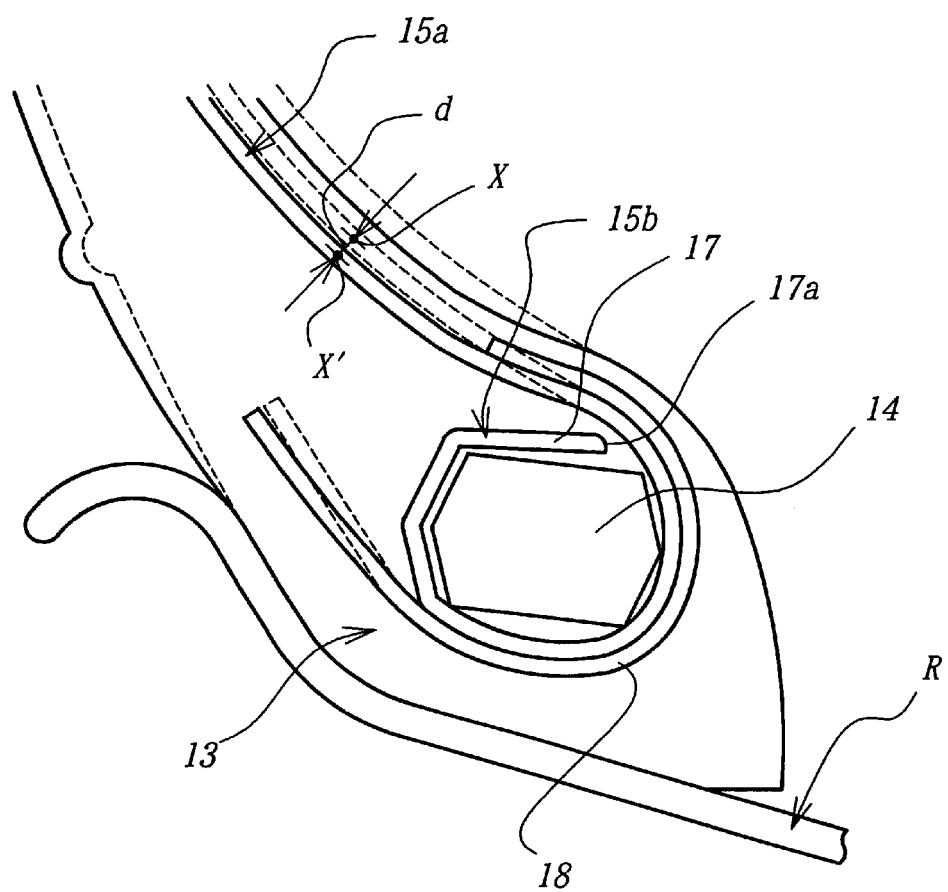
FIG. 5 is an enlarged view of a main part of a bead portion in the tire of FIG. 4.

In FIG. 4 is shown a first embodiment of the pneumatic tire according to the invention and FIG. 5 shows an enlarged view of a main part of a bead portion in the tire shown in FIG. 4, wherein numeral 11 is a tread portion, numeral 12 a sidewall portion continuously connecting from an end of the tread portion 11, numeral 13 a bead portion continuing from an inside of the sidewall portion 12 in a radial direction of the tire, and numeral 14 a bead core embedded in the bead portion 13 and having a hexagonal shape at a section thereof in the radial direction.

In the illustrated embodiment, a carcass ply 15 containing a steel cord(s) arranged substantially at a cord angle of 90° with respect to an equatorial plane of the tire and having a tenacity of 80–300 kgf, preferably 100–180 kgf is toroidally extended from the tread portion 11 through the sidewall portion 12 to the bead portion 13 and turned around the bead core 14 from an inside toward an outside in the radial direction of the tire.

Figure 6:
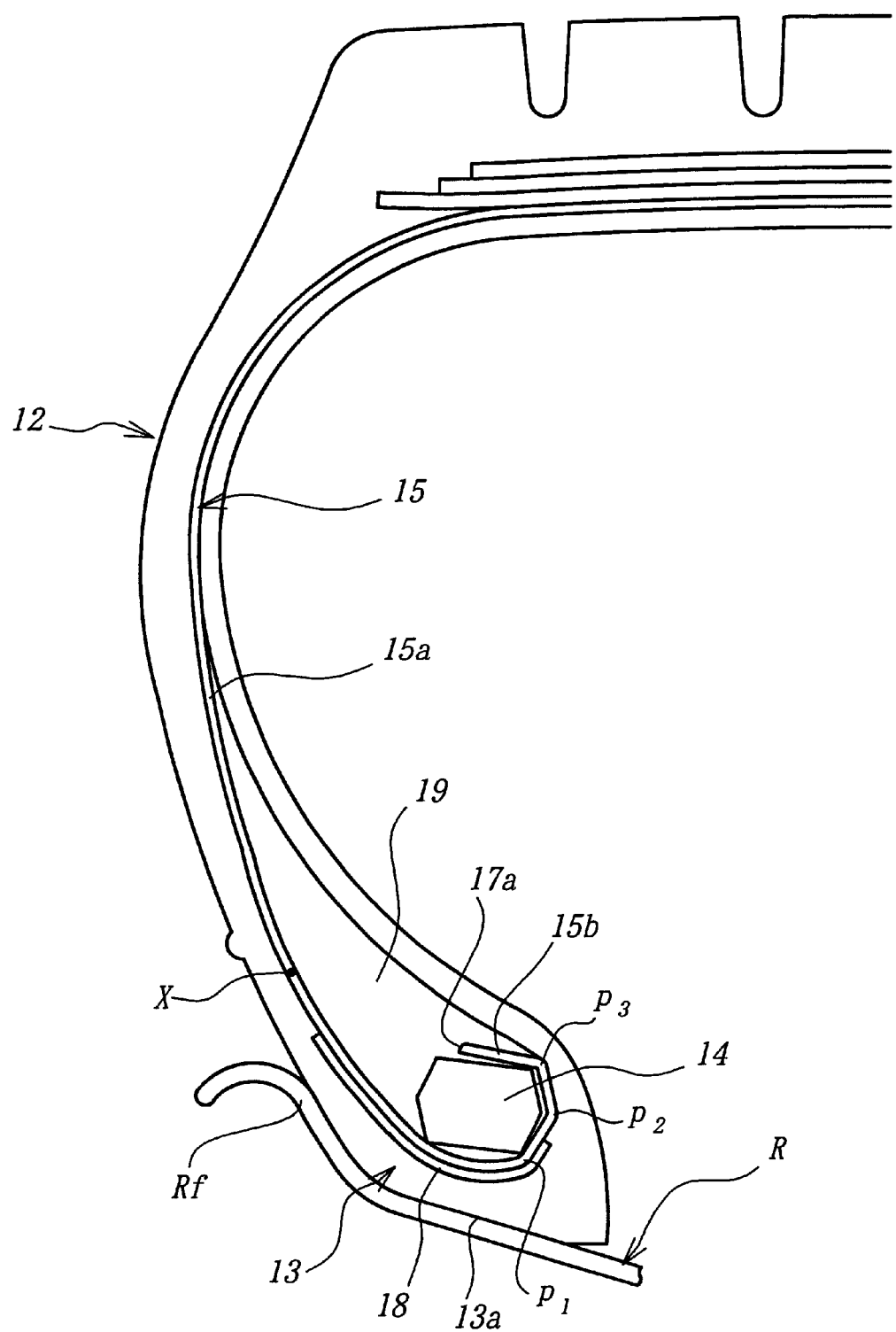
FIG. 6 is a diagrammatically left-half section view of a second embodiment of the pneumatic tire according to the invention.

As the turning embodiment, there are a case that the carcass ply is turned from the inside toward the outside in the widthwise direction of the tire as shown in FIG. 4, and a case that the carcass ply is turned from the outside toward the inside in the widthwise direction of the tire as shown in FIG. 6. In both the cases, a turnup portion 15b of the carcass ply 15 has a wrap part 17 wrapping on a peripheral face of the bead core 14 therealong.

In the wrap part 17 shown in FIGS. 4 and 6, three plastic deformation regions $p_1$, $p_2$, $p_3$ corresponding to radial section profile of the bead core 14 are previously formed in a portion of the carcass ply 15 corresponding to the warp part 17 prior to the winding of the carcass ply 15 around the bead core 14 and a top end portion of the carcass ply is particularly wrapped on the bead core 14 sufficiently near to the peripheral face thereof and more accurately followed thereto by the action of such plastic deformation regions.

And also, the wrap part 17 is extended along the peripheral face of the bead core 14 over a half periphery of the sectional profile of the bead core 14, for example, a half periphery of the bead core 14 located at a side of a bead base 13a. In the illustrated embodiment of FIG. 4, an outer end 17a of the warp part 17 is located inward over a position Q of an outer circumferential edge of the bead core 14 in the widthwise direction of the tire at a state of mounting the tire onto a rim R under an inflation of a maximum air pressure.

Moreover, numeral 18 is a wire chafer arranged around the bead core 14 and circumscribed with the carcass ply 15, which may be used if necessary.

In the tire having the above structure, the wrap part 17 is formed on the turnup portion 15b, so that the pulling-out of the carcass ply cord is effectively prevented and also separation failure of the turnup portion 15b can effectively be prevented under the action of the bead core 14 and the rim R.

As a natural consequence that the pulling-out of the carcass ply cord is effectively prevented as mentioned above, even when the wire chafer 18 is used as a necessary constructional member, the outer end of the wire chafer 18 in the radial direction can sufficiently be located toward an inner peripheral side in the radial direction, whereby the deformation amount of the outer end and its neighborhood is decreased to effectively remove a fear of causing separation failure at the outer end of the wire chafer.

Figure 7:
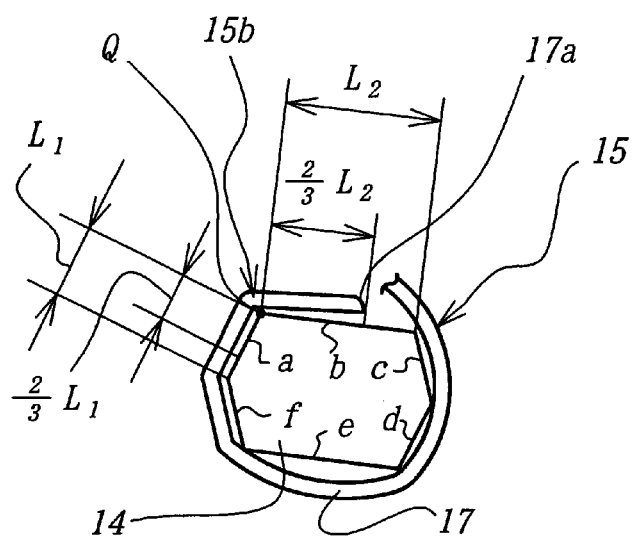
FIG. 7 is an enlarged view of a bead core shown in FIG. 4.

In order to ensure such effects of the pneumatic tire, as the section of the bead core 14 in FIG. 4 is enlargedly shown in FIG. 7, it is favorable that the end 17a of the wrap part 17 is located on any side among three sides a, b, c separated from the bead base 13a. More preferably, the position of the end 17a is within a range from a position corresponding to ⅔ of a length $L_1$ of the side a to a position corresponding to ⅔ of a length $L_2$ of the side b including an intersect position Q between the side a and the side b.

In the illustrated embodiments of FIGS. 4 and 6, the wrap part 17 is interposed between the bead core 14 and the bead filler 19, whereby the restraining force to the wrap part 17 is enhanced to more develop the above effects.

Figure 8:
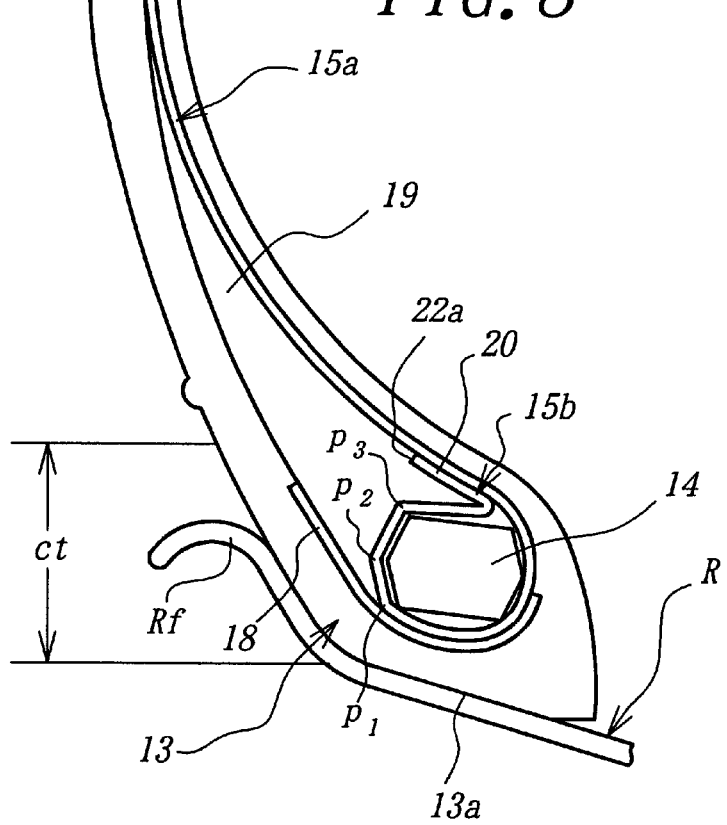
FIG. 8 is a diagrammatically left-half section view of a third embodiment of the pneumatic tire according to the invention.

Moreover, when the wrap part 17 is interposed as mentioned above, if the turnup portion 15b has a protrusion end zone 20 extending outward along a main body 15a of the carcass ply 15 in the radial direction of the tire and separated away from the bead core 14 as shown in FIG. 8, the protrusion end zone 20 may be released from the above interposed region between the bead core and the bead filler.

In case of the turnup portion 15b having the protrusion end zone 20, it is favorable to locate an end 20a of the protrusion end zone 20 inward from an outer peripheral edge of the contact region ct of the bead portion 13 with the rim flange Rf in the radial direction of the tire under conditions of maximum air pressure and maximum load capacity, whereby the deformation of the end 20a and its neighborhood during the running of the tire under loading can effectively be restrained by the rim flange Rf.

Figure 9A:
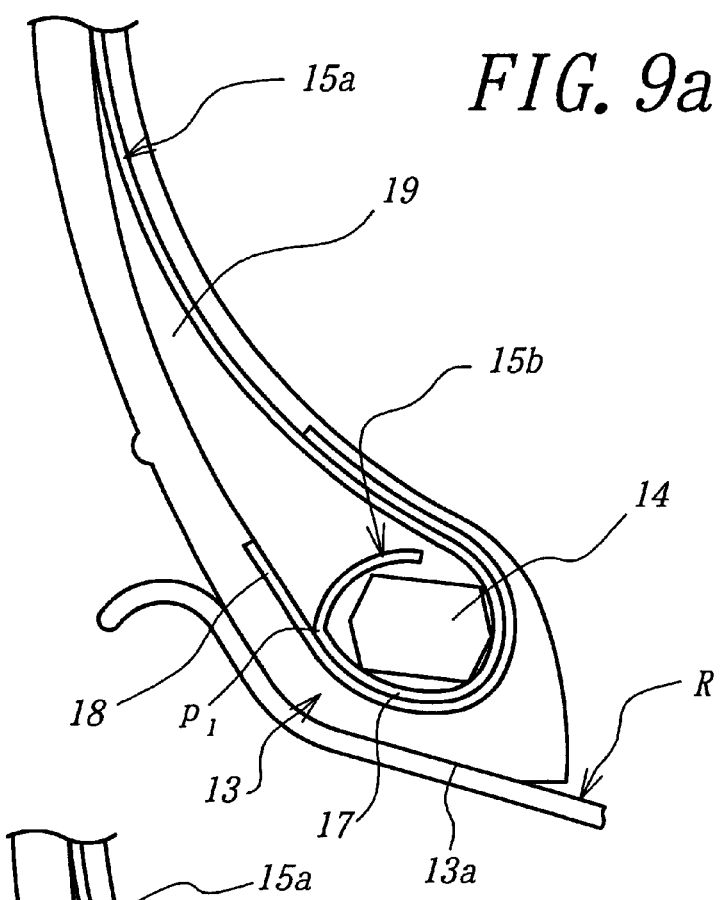
FIGS. 9a and 9b are diagrammatically left-half section views of fourth and fifth embodiments of the pneumatic tire according to the invention, respectively.
Figure 9B:
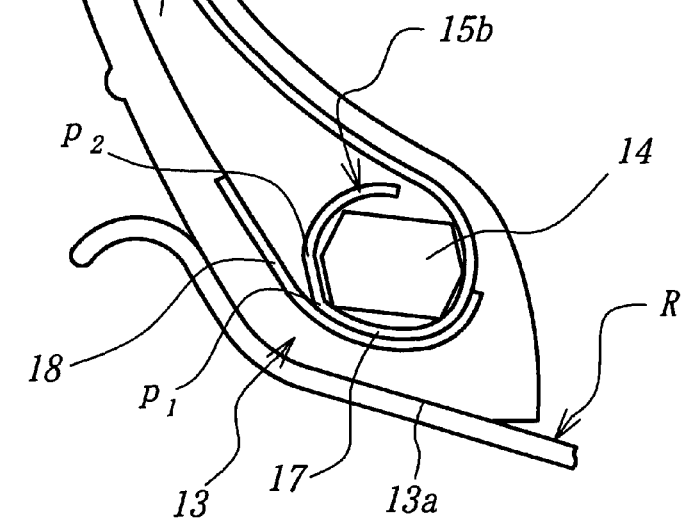

Although the above embodiments are described by forming three plastic deformation regions $p_1$, $p_2$, $p_3$ in the wrap part 17, the number of the plastic deformation regions can be properly changed, if necessary. For example, the formation of one plastic deformation region is shown in FIG. 9a, and the formation of two plastic deformation regions is shown in FIG. 9b, and the formation of four plastic deformation regions is shown in FIGS. 10a and 10b, respectively.

Figure 10A:
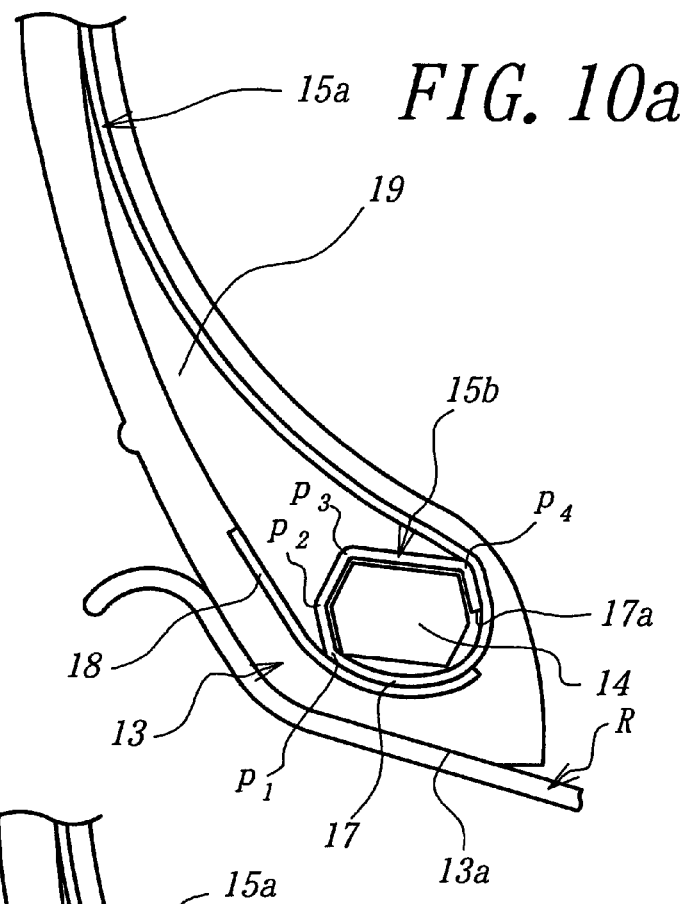
FIGS. 10a and 10b are diagrammatically left-half section views of sixth and seventh embodiments of the pneumatic tire according to the invention, respectively.
Figure 10B:
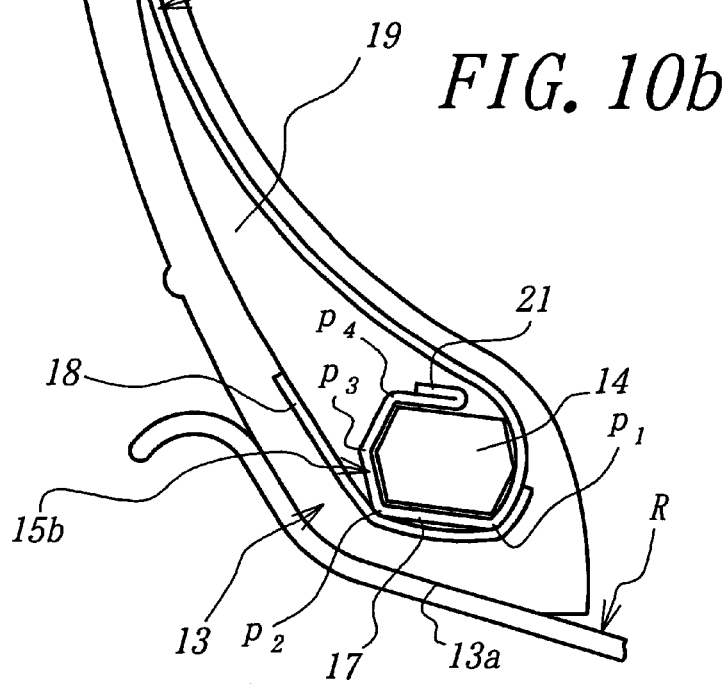

In case of the four plastic deformation regions $p_1$, $p_2$, $p_3$ and $p_4$, when an end 17a of the wrap part 17 is interposed between the main body 15a of the carcass ply 15 and the bead core 14 as shown in FIG. 10a, the restraint to the wrap part 17 can strongly be increased, while when the end portion of the wrap part 17 is folded outward in the widthwise direction of the tire to form a fold zone 21 as shown in FIG. 10b, there is not caused tensile strain at the end portion of the carcass ply and hence the pulling-out of the carcass ply cord and the occurrence of crack hardly occur.

In the pneumatic tires having the aforementioned structure, the wrap part 17 wrapping on the bead core 14 along the peripheral face thereof is formed in the turnup portion 15b of the carcass ply 15, whereby the occurrence of separation failure at the wrap part 17 and hence the turnup portion 15b is prevented and also the pulling-out of the carcass ply cord can be prevented. And also, the number of the reinforcing layers in the bead portion 13 can advantageously be reduced to control the heat generation of the bead portion 13 and reduce the tire weight and increase the tire productivity.

Furthermore, the occurrence of separation failure at an outer end of the wire chafer 18 in the radial direction can sufficiently be prevented because the height of the wire chafer in the radial direction can be set to a lower level based on the fact that there is no fear of causing the pulling-out of the carcass ply cord.

In the tire of FIGS. 4 and 5, when the displacement d of the point X changed from the deflate state to the inflate state is not more than 3 mm as measured at the section in widthwise direction of the tire, the permanent set in fatigue of the bead portion can considerably be decreased.

Furthermore, the radius of curvature R0 in the point X at the deflate state is favorable to satisfy $R_0<2H$, preferably $R_0<H$. Thus, the permanent set in fatigue of the bead portion can be more decreased.

In case of $R_0<H$, the pushing amount (i.e. displacement d) of the bead portion at the inflate state can be made zero or the bead portion can be deformed (recessed) in a direction opposite to the pushing direction, whereby the permanent set in fatigue of the bead portion can be more controlled.

As shown in FIG. 11, a rubber reinforcing member 16 may be disposed at an inner surface side of the main body 15a of the carcass ply 15 over a range of from the bead portion 13 to the sidewall portion 12. In this case, the radius of curvature $R_0$ of the carcass ply 15 in the point X at the deflate state can be made small, whereby the pushing deformation of the carcass outward in the widthwise direction of the tire can be controlled at the inflate state.

The rubber reinforcing member 16 is favorable to have a modulus at 100% elongation of 1–3 MPa and is preferably disposed from a position distanced by 10 mm upward from the bead core in the radial direction up to a neighborhood of a maximum width position of the sidewall portion.

Figure 12A:
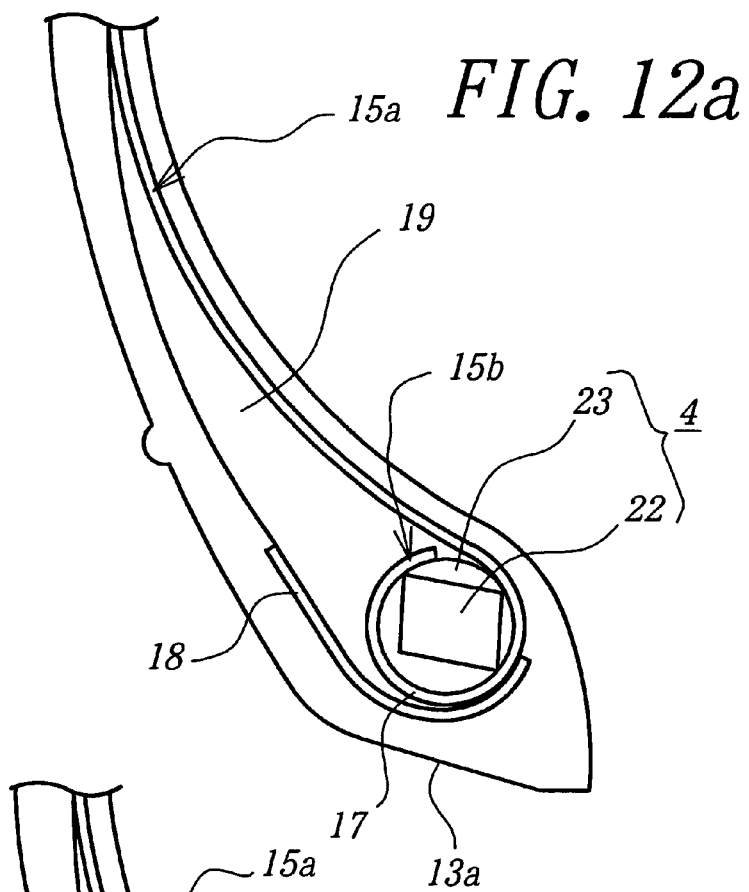
FIGS. 12a and 12b are diagrammatically left-half section views of ninth and tenth embodiments of the pneumatic tire according to the invention, respectively.
Figure 12B:
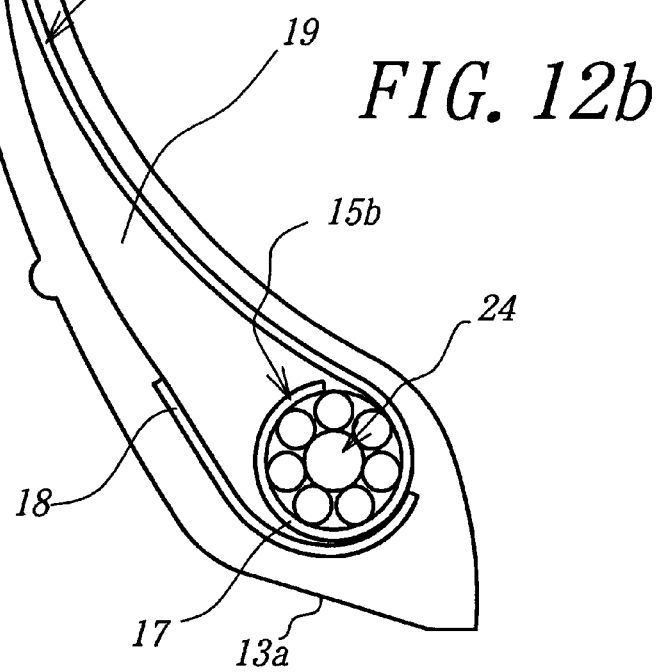

As the bead portion structure, there may be taken a structure that the wrap part 17 is wrapped on the bead core 4 formed by embedding a plate bead 22 in a hard rubber 23 as shown in FIG. 12a, and a structure that the wrap part 17 is wrapped on the bead core 4 consisting of a round bead 24 as shown in FIG. 12b in addition to the structure that the wrap part 17 is wrapped on the bead core 4 having a hexagonal section as shown in FIG. 4.

Figure 13:
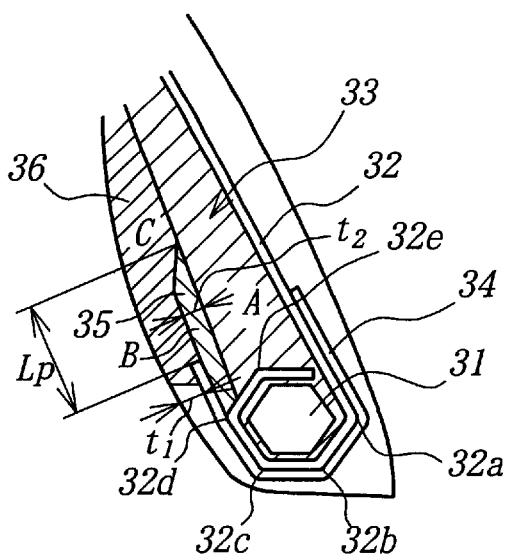
FIG. 13 is a diagrammatically left-half section view of an eleventh embodiment of the pneumatic tire according to the invention.

In FIG. 13 is diagrammatically shown the other embodiment of the heavy duty pneumatic tire according to the invention, wherein numeral 31 is a bead core having a hexagonal shape at its section, numeral 32 at least one carcass ply containing steel cords therein and having a wrap part wrapped on the bead core 31 at five plastic deformation regions 32a, 32b, 32c, 32d, 32e corresponding to corners of the bead core. And also, numeral 33 is a bead filler, numeral 34 a bead portion reinforcing layer of steel cords arranged along an outer surface of the carcass ply 32, numeral 35 a rubber layer disposed between the bead filler 33 and the bead portion reinforcing layer 34, and numeral 36 a side rubber constituting a sidewall portion of the tire.

Figure 14:
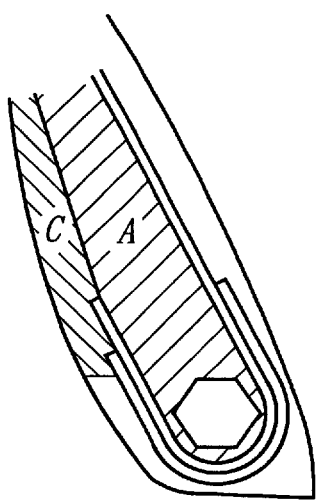
FIG. 14 is a diagrammatically left-half section view of another conventional pneumatic tire.

On the other hand, an example of the bead portion structure in the conventional heavy duty pneumatic tire is diagrammatically shown in FIG. 14. When such a conventional tire is mounted onto a heavy duty vehicle recently used by increasing an output and tire weight, a load in the bead portion becomes large and it tends to extremely shorten the life of the bead portion due to the occurrence of separation failure of the carcass ply in the bead portion. In the tire having the structure shown in FIG. 13, however, strain in the end portion of the carcass ply 32 and the end portion of the bead portion reinforcing layer 34 can be decreased and hence the separation failure hardly occurs and the durability of the bead portion is improved.

Figure 15:
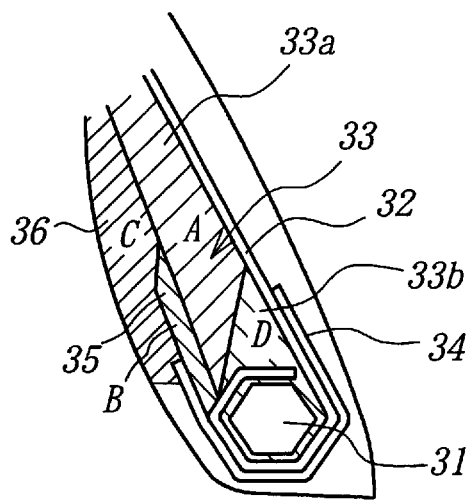
FIG. 15 is a diagrammatically left-half section view of a twelfth embodiment of the pneumatic tire according to the invention.

In FIG. 15 is diagrammatically shown a still further embodiment of the heavy duty pneumatic tire according to the invention, which is a modified embodiment of the tire shown in FIG. 13. That is, the bead filler 33 is comprised of a main rubber stock 33a having a JIS hardness of 60–80° and a sub-rubber stock 33b having a JIS hardness of not less than 80°. By adopting such a bead filler 33 can be controlled the deformation of the bead portion as a whole in the circumferential direction to reduce shearing strain applied to the bead portion reinforcing layer 34.

Figure 16:
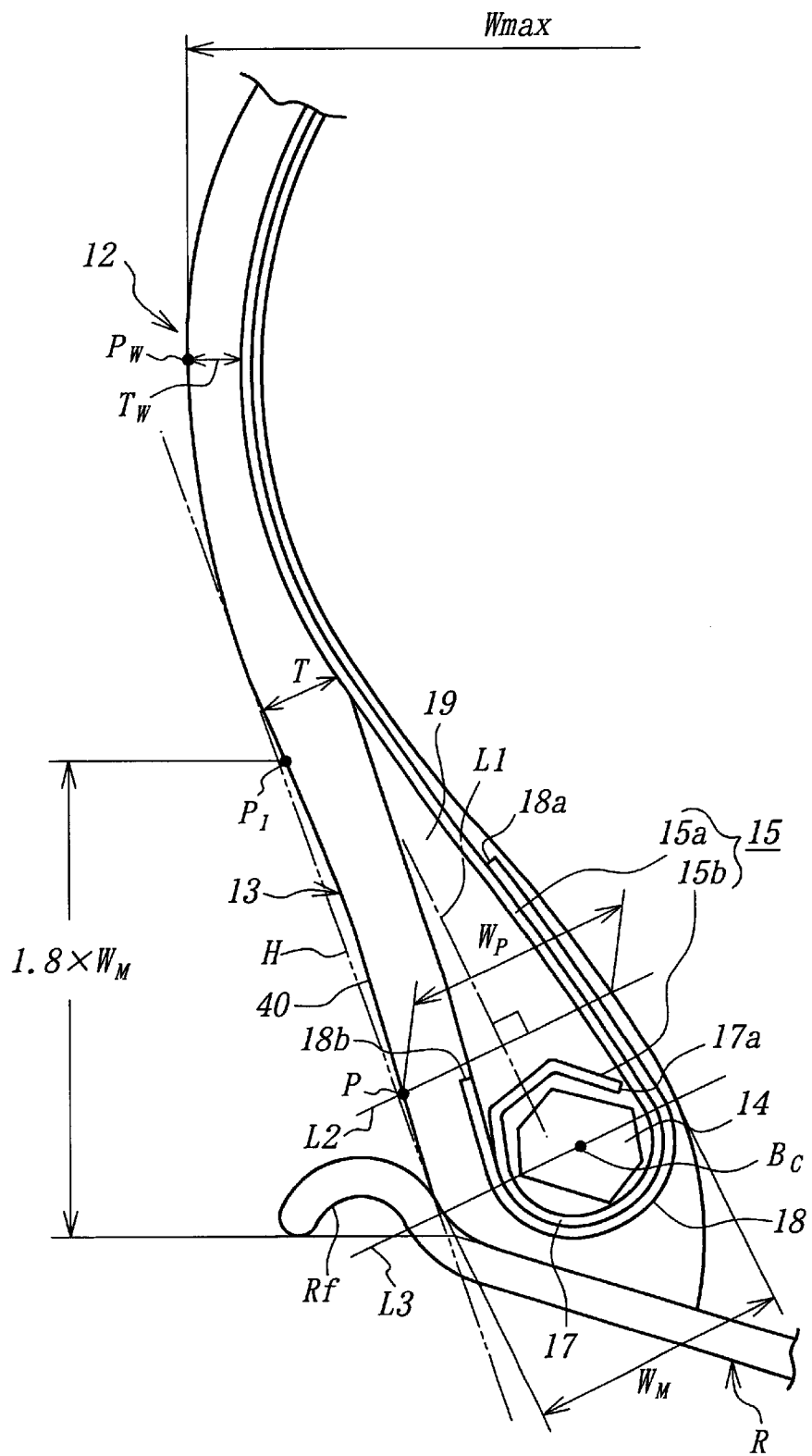
FIG. 16 is a diagrammatically left-half section view of a thirteenth embodiment of the pneumatic tire according to the invention.

In FIG. 16 is diagrammatically and partly shown a yet further embodiment of the heavy duty pneumatic radial tire according to the invention, which has the same structure as the tire shown in FIG. 4 except that a recess zone 40 is formed in an outer surface of a part of the bead portion 13 located inward from a position PW of a maximum tire width at a radial section of the tire. Moreover, FIG. 16 shows a state under no load.

The recess zone 40 is a portion forming a space between the outer surface of the bead portion and a plane H contacting with the outer surface at two points (shown by a phantom line) as shown in FIG. 16. Moreover, the recess zone 40 has substantially an arc shape, a curvature center of which is located outside the tire at the radial section of the tire.

Figure 17:
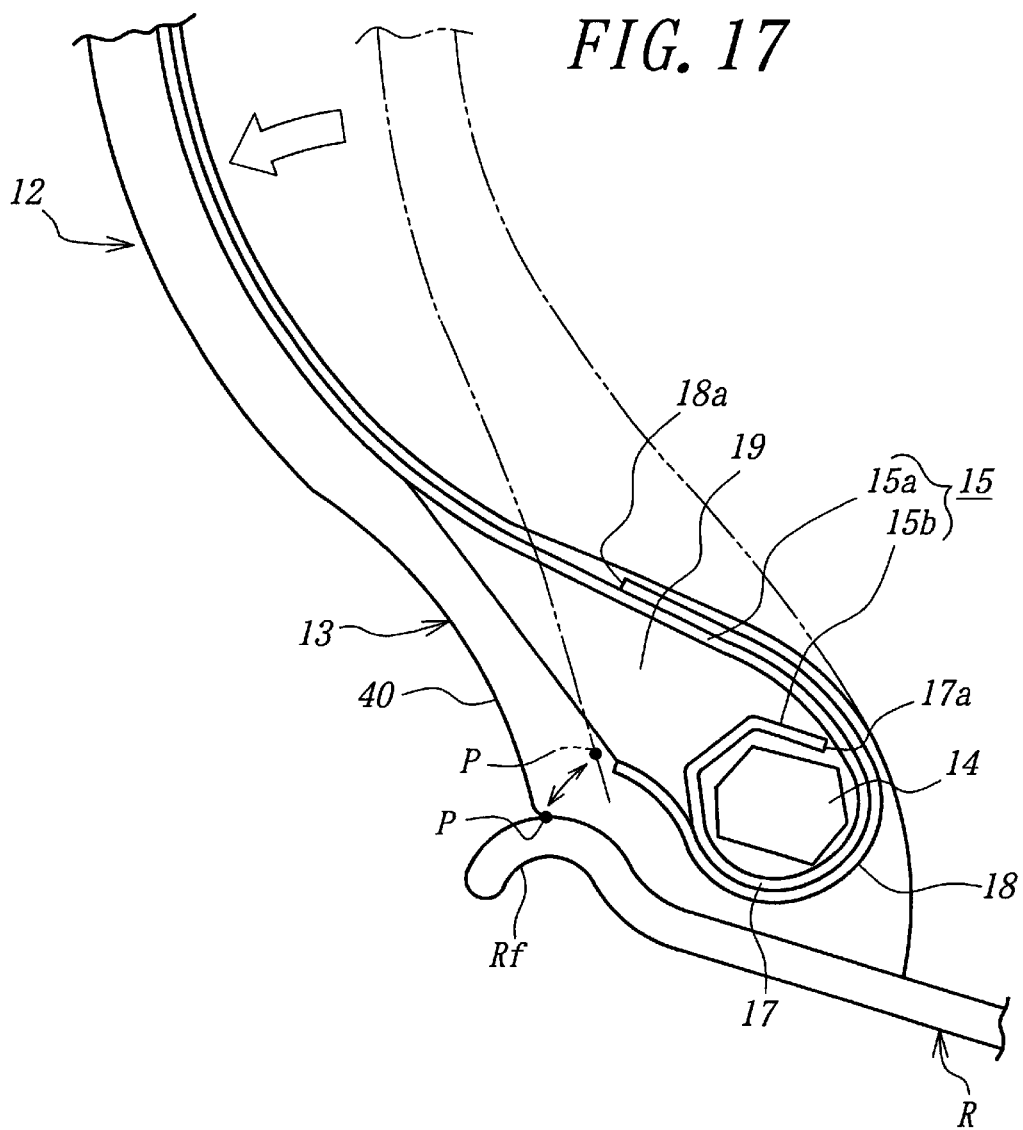
FIG. 17 is diagrammatically left-half section view illustrating a deformation behavior of the tire shown in FIG. 16.

When the tire of FIG. 16 is mounted onto the recommended rim R and subjected to the maximum load under the maximum air pressure, as shown by a solid line in FIG. 17, a point of the outer surface of the bead portion 13 separated from the rim flange Rf is an alienation point P, and a bisector dividing the bead portion into two parts at the alienation point P is L1 (shown by a dot-dash line), and a line passing through the alienation point P and perpendicular to the bisector L1 as shown in FIG. 16 is L2, and a line passing through a center $B_c$ of the bead core 14 and parallel to the normal line L2 is L3, and a thickness of the bead portion on the normal line L2 is $W_P$, and a thickness of the bead portion on the parallel line L3 (hereinafter called as maximum bead portion width) is $W_M$.

In the tire of FIG. 16, it is favorable that the rubber gauge T (distance from the steel cord in the carcass ply 15 to the outer profile of the tire) in a region ranging outward from the position $P_1$ corresponding to 1.8 times the maximum bead portion width $W_M$ located from the position of the nominal diameter of the rim flange Rf in the radial direction of the tire to the position $P_W$ of the maximum tire width (Wmax is a maximum tire width in FIG. 16) is made substantially equal to the rubber gauge $T_W$ (distance from the steel cord in the carcass ply to the outer surface of the tire) at the position $P_W$ of the maximum tire width (the term "substantially equal" used herein means 0.7—1.3 times the rubber gauge $T_W$ at the position $P_W$ of the maximum tire width).

In the illustrated embodiment, a ratio of thickness of bead portion $W_P$ on the normal line L2 to maximum bead portion thickness $W_M$ of the bead portion 13 is set to 0.88.

In the illustrated tire, the rubber gauge of the bead portion is decreased by forming the recess zone 40 in the outer surface of the bead portion 13, so that heat build-up of the bead portion 13 is reduced during the running of the tire under loading and hence the bead portion durability can largely be improved.

Moreover, if the rubber gauge T located outward from the position $P_1$ in the radial direction is not substantially equal to the rubber gauge $T_W$ at the position $P_W$, or if the rubber gauge T is thinner than the rubber gauge $T_W$ (T is less than 0.7 $T_W$), the portion near to the bead core 14 is too thin and the bending deformation of the bead portion concentrates near to the bead core 14 and hence it is apt to cause the crack at the outer surface of the bead portion due to the concentration of strain in the outer surface of the bead portion near to the bead core.

Figure 18:
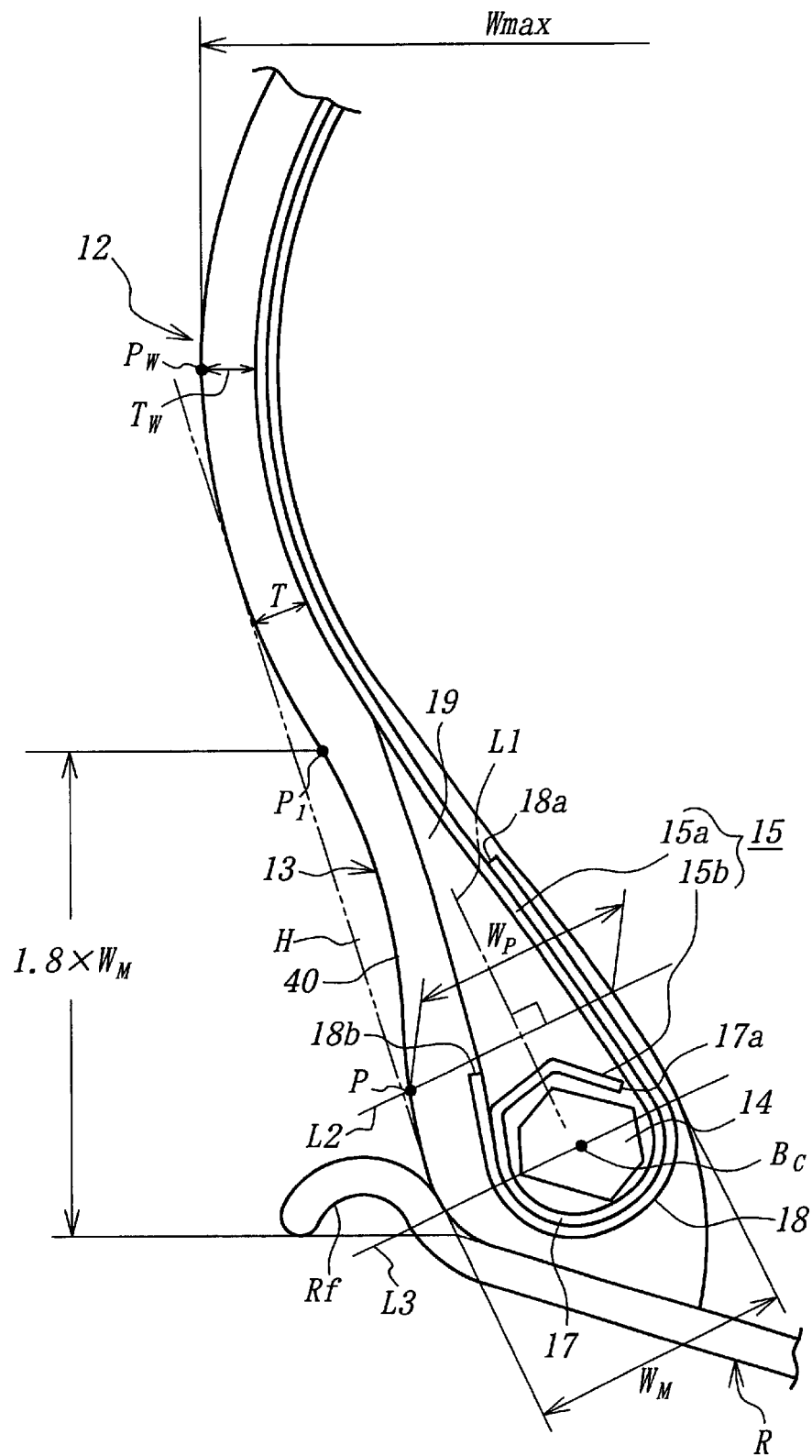
FIG. 18 is a diagrammatically left-half section view of a fourteenth embodiment of the pneumatic tire according to the invention.

In FIG. 18 is shown a modified embodiment of the tire shown in FIG. 16, wherein the depth of the recess zone 40 is deeper than that of FIG. 16 and the ratio of thickness $W_P$ of bead portion on the normal line L2 to maximum bead portion thickness $W_M$ is set to 0.85.

Figure 19:
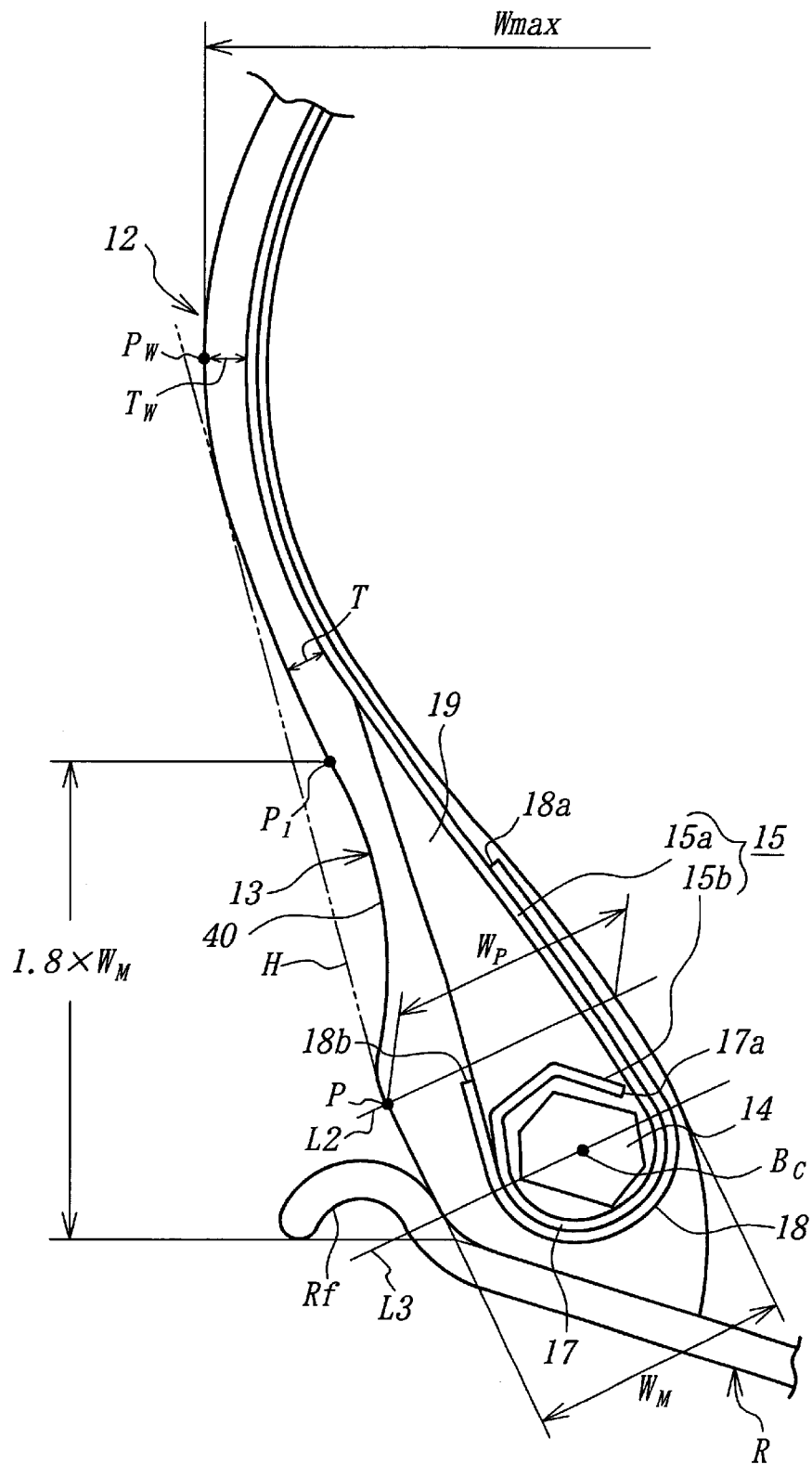
FIG. 19 is a diagrammatically left-half section view of a fifteenth embodiment of the pneumatic tire according to the invention.

In FIG. 19 is shown another modified embodiment of the tire shown in FIG. 16, wherein the recess zone 40 is formed outward from the alienation point P of the bead portion 13 in the radial direction, and the outer surface of the bead portion 13 located inward from the recess zone 40 in the radial direction has an approximately arc shape, a curvature center of which being located at the inside of the tire, and the ratio of thickness $W_P$ of bead portion on the normal line L2 to maximum bead portion thickness $W_M$ is set to 0.92. In this case, the fall-down deformation of the bead portion 13 under loading can be more suppressed as compared with the cases of FIGS. 16 and 18 and hence heat build-up can be more controlled.

In FIG. 21 is shown an embodiment of the apparatus for manufacturing a pneumatic tire according to the invention, wherein numeral 50 is a motor, numeral 52 a carcass band drum attached to an output shaft of the motor 50. The carcass band drum 52 is added with a shaping means mentioned later and mainly acts to laminate and wind tire constructional members such as an innerliner, a carcass ply and the like fed from a servicer 54 onto a peripheral surface of the carcass band.

Moreover, a belt-tread band drum (hereinafter referred to as BT drum) 56 is attached to the output shaft of the motor, and a belt and a tread fed from a service 58 are successively laminated and wound by the BT drum 56.

In the illustrated embodiment, an O-ring 60 and a pair of bead setters 62 are successively separated from the carcass band drum 52 at a side opposite to the motor 50 and arranged with respect to the carcass band drum 52. In this case, the O-ring 60 stands at a state of holding a belt-tread band (hereinafter referred to as BT band) formed on the BT drum 56 for a period up to joining and acts to transport the BT band to an outer peripheral position of the carcass band drum 52 at the joining of the BT band. The bead setter 62 acts to insert a ring-shaped bead core previously held at the bead setter into an inside of a bend end portion of the cylindrical carcass band as mentioned later.

In the vicinity of the carcass band drum 52 are arranged a carcass band bending apparatus 64 for subjecting each end portion of the cylindrical carcass band formed on the drum 52 to a given bending work over full is periphery of the carcass band, and stitcher rolls 66 for sufficiently pressing the bend end portion of the cylindrical carcass band to the bead core inserted into the inside thereof.

Figure 21A:
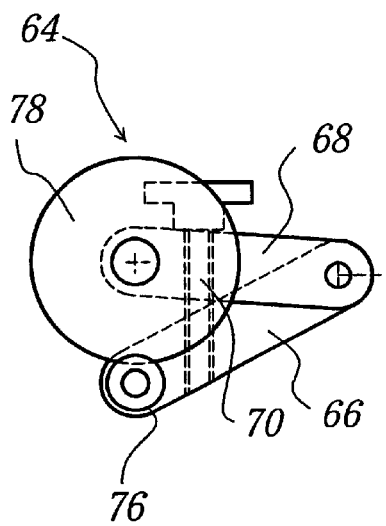
FIGS. 21a and 21b are a side view and a front view partly shown in section of an embodiment of the carcass band bending apparatus used in the invention, respectively.
Figure 21B:
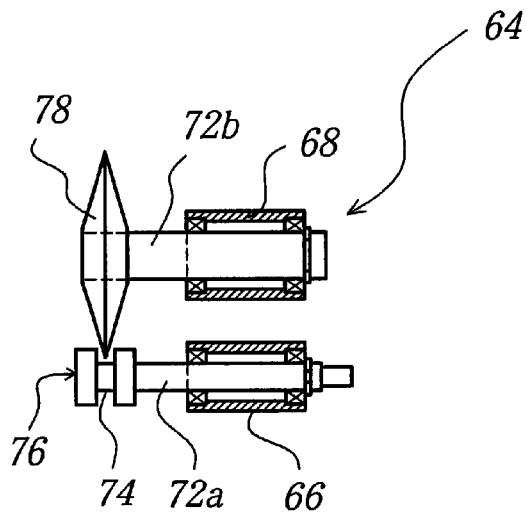

As shown in FIGS. 21a and 21b, the carcass band bending apparatus 64 can be constituted by two arm members 66, 68 hinged to each other, a handled clamp screw 70 capable of properly adjusting a relative angle between the arm members, shafts 72a, 72b passing through free end portions of the arm members 66, 68 in their thickness directions and extending in parallel to each other and rotatably supporting these free end portions, a shaft-shaped member 76 provided with an annular groove 74 and attached to either one of the shafts (72a) and a disc-shaped member 78 attached to the other shaft (72b) so as to put at least peripheral part into the annular groove 74 and having a shape similar to a counter of an abacus in the illustrated embodiment. Preferably, a plurality of fine grooves extending in an axial direction are formed on a surface of the shaft-shaped member 76 other than the annular groove 74 by subjecting such a surface to knurling work for enhancing friction force to the cylindrical carcass band.

The carcass band bending apparatus can be actuated by connecting a rotation driving means (not shown) to at least one of the shafts (shaft 72a in the illustrated embodiment) and driving the shaft 72a at a state of sandwiching a given position of an end portion of the cylindrical carcass band between the shaft-shaped member 76 and the disc-shaped member 78 at a given force.

Figure 22:
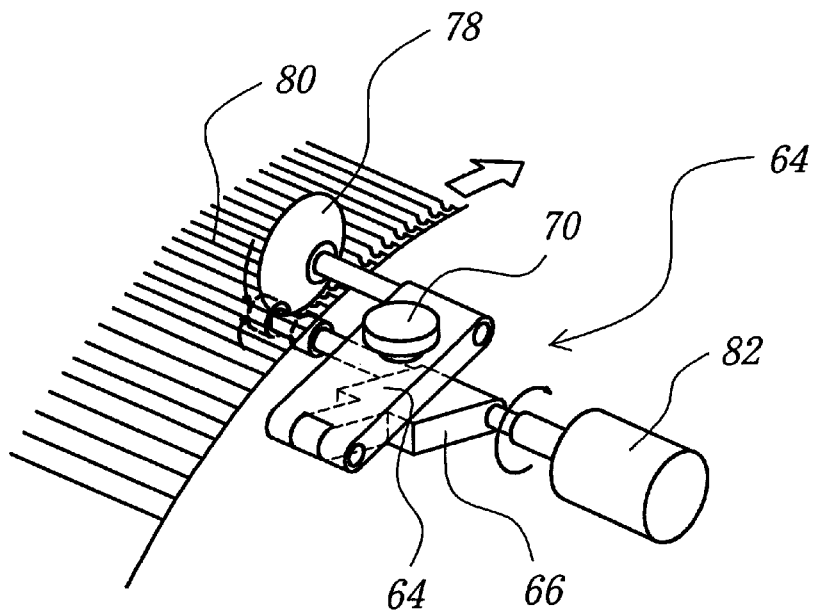
FIG. 22 is a perspective view illustrating an action of the apparatus shown in FIG. 21.

This is illustrated in FIG. 22, wherein a given position of an end portion of a cylindrical carcass band 80 is pushed into an annular groove 74 of the shaft-shaped member 76 through the disc-shaped member 78 by screwing of the clamp screw 70 and the shaft 72a and hence the shaft-shaped member 76 is rotated by the actuation of a motor 82 connected to the shaft 72a, whereby the shaft-shaped member 76 is relatively moved to the cylindrical carcass band 80 in a direction opposite to the rotating direction based on friction force to the carcass band 80, while the disc-shaped member 78 is rotated in the above relative moving direction by the friction force to the carcass band 80 while maintaining a state of pushing the carcass band 80 into the annular groove 74. As a result, the end portion of the carcass band 80 is subjected to a required bending formation over its full periphery.

In this case, the carcass band bending apparatus 64 can be moved to a position-specified cylindrical carcass band 80, or only the cylindrical carcass band 80 can be rotated, or both these cases may be combined.

In the bending apparatus 64, the shaft-shaped member 76 can be contacted with an outer peripheral surface of the carcass band 80 and the disc-shaped member 78 can be contacted with an inner peripheral surface of the carcass band 80 in relation to the bending direction of the end portion of the carcass band 80.

Figure 23:
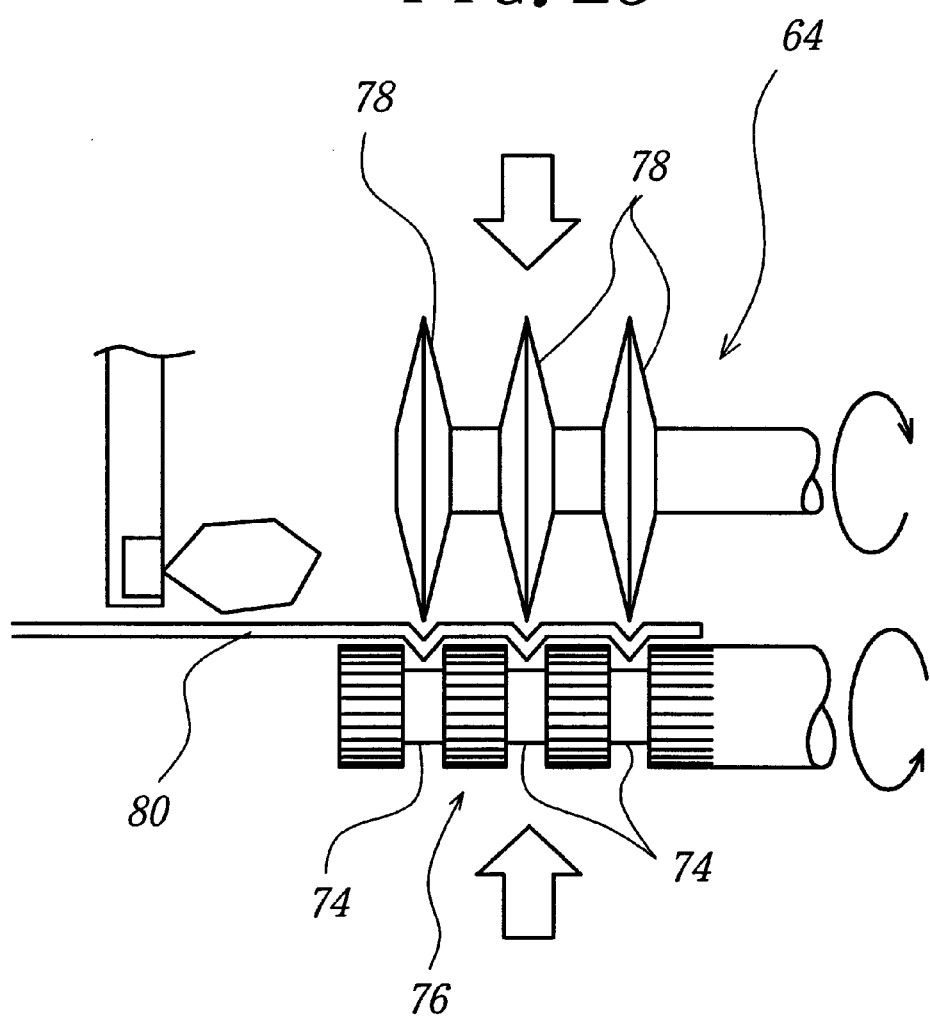
FIG. 23 is a front view illustrating another embodiment of the carcass band bending apparatus used in the invention.

In FIG. 23 is shown another embodiment of the bending apparatus, wherein three annular grooves 74 are formed in the shaft-shaped member 76 at given intervals in the axial direction thereof and three disc-shaped members 78 are arranged side by side on its axial line at positions corresponding to the annular grooves 74.

According to the illustrated embodiment of FIG. 23, three bent portions can simultaneously be formed on the end portion of the carcass band 80 in the same directions, so that the bending formation efficiency can be three times that of the case shown in FIGS. 21 and 22.

The manufacturing method according to the invention using the above manufacturing apparatus will be described with reference to FIG. 24. At first, an innerliner, a sidewall, a wire chafer and the like fed from the servicer 54 are wound around the carcass band drum 52 as shown in FIG. 24a and then a carcass ply fed from the servicer 54 is laminated wound around the carcass band drum to form a cylindrical carcass band 80 as shown in FIG. 24b.

In this case, it is favorable that each end portion of the cylindrical carcass band 80 is laminated through a releasing member, for example, a plastic sheet 82 for facilitating the putting operation through the bending apparatus 64 in the bending formation work.

Figure 20:
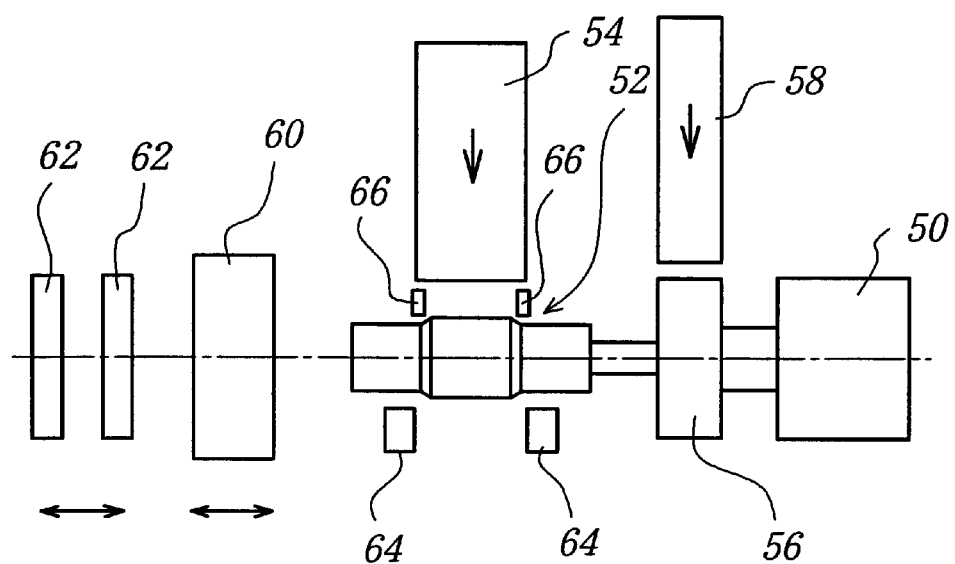
FIG. 20 is a schematically plan view illustrating an embodiment of the tire manufacturing apparatus according to the invention.

Thereafter, a pair of bead setters 62 shown in FIG. 20 are moved onto a central portion of the carcass band drum 52 and hence the cylindrical carcass band 80 at a state of magnetically adsorbing a ring-shaped bead core 86 on a bead holder 84 as shown in FIG. 24c, at where a given position of each end portion of the cylindrical carcass band 80 is putted between the shaft-shaped member 76 and the disc-shaped member 78 in the carcass band bending apparatus 64 at a given force and the cylindrical carcass band 80 is subjected to the required bending formation work over its full periphery under the aforementioned action of the bending apparatus 64.

In FIG. 24d is shown a state that bent end portions 88 directing outward in the radial direction are formed on both end portions of the carcass band 80 by simultaneously forming three bending work parts on each of the shaft-shaped member 76 and the disc-shaped member 78 of bending apparatus 64 in the axial direction of the carcass band 80 as shown in FIG. 23.

In such a bending apparatus 64, the insertion of the shaft-shaped member 76 into the inner peripheral side of the carcass band 80 can easily be carried out by maintaining the end portion of the carcass band 80 through the plastic sheet 82 at a non-joined state to the members arranged in the inner peripheral side. Therefore, the plastic sheet 82 may properly be removed at a subsequent stage.

Moreover, local outward pushing of the cylindrical carcass band 80 in the radial direction due to the insertion of the shaft-shaped member 76 into the inner peripheral side of the carcass band 80 on the carcass band drum 52 can be eliminated by enlarging the carcass band 80 over its full periphery through the operation of the bead lock mentioned later.

Figure 25A:
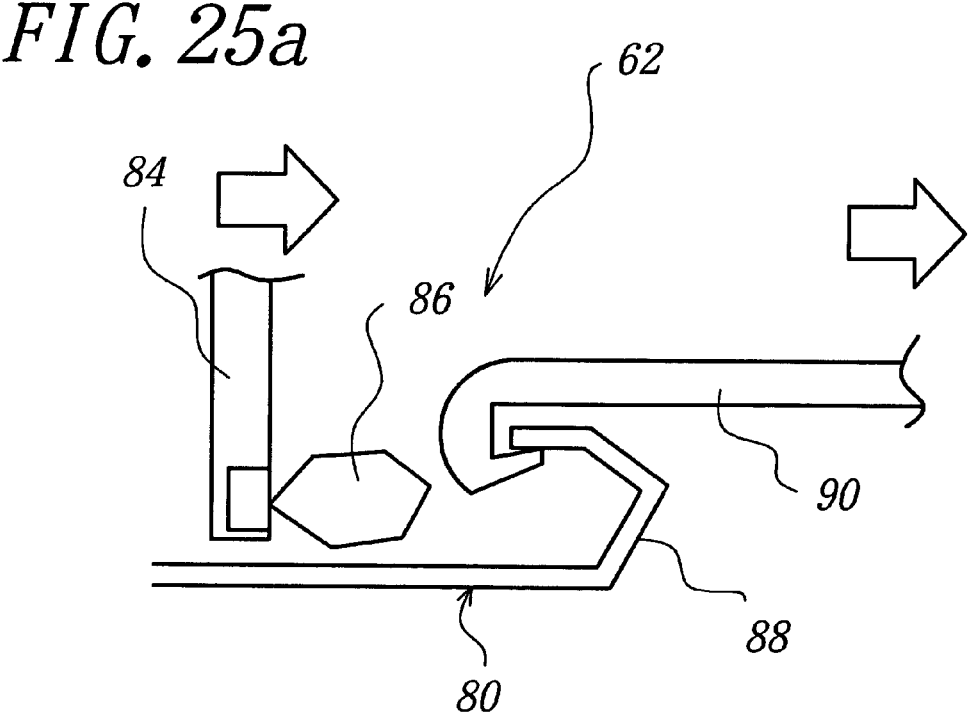
FIGS. 25a and 25b are block diagrams illustrating action steps of a bead setter.
Figure 25B:
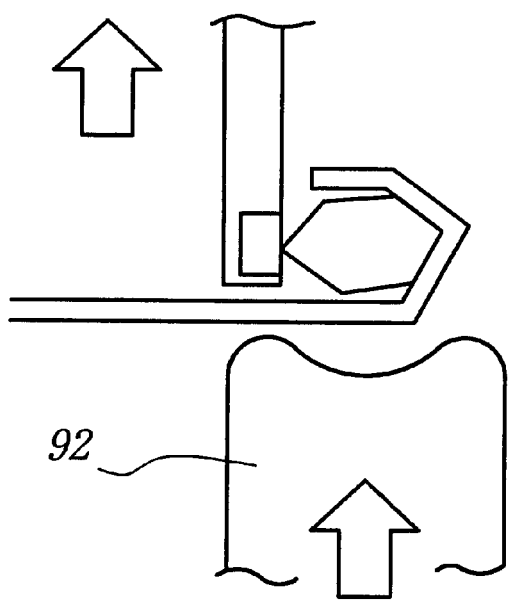

The bead core 86 held by the bead holder 84 is inserted into an inside of a bent end portion 88 formed in the cylindrical carcass band 80 under the action of the bead setter 62. This is shown in FIGS. 25a and 25b. At first, hooks of hook-shaped enlarging members 90 in the bead setter 62 are engaged with an end of the bend end portion 88 at plural positions in the circumferential direction and then the hooks are moved in a direction of opening the end of the bend end portion 88 or outward in the axial direction of the carcass band 80 in FIG. 25a to deform the bend end portion 88 in its elastic zone. Thereafter, the bead holder 84 and hence the bead core 86 adsorbed on the outer surface thereof is moved to the axial end direction of the carcass band 80 while maintaining such a deformed state to locate the bead core 86 at the inside of the bend end portion 88. Then, the engagement of the hook-shaped enlarging member 90 with the bent end portion 88 is released to return the bent end portion 88 into the original bending work shape.

In this case, the returning into the original bending work shape may be obstructed in accordance with the shape, size and the like of the bent end portion 88 when the bent end portion 88 is closed to the peripheral face of the bead core 86.

Thereafter, the bead lock 92 arranged in the carcass band drum 52 is actuated outward in the radial direction to hold the bead core 86 inside the bent end portion 88 from its inner peripheral side at plural positions in the circumferential direction, whereby it is made possible to separate the bead core 86 from the bead holder 84 magnetically adsorbing the bead core 86.

Moreover, since the bead lock 92 restrains the relative movement of the bead core 86 to a direction crossing to the axial line of the carcass band drum, but allows the movement in the axial lien direction, a shaping means incorporated in the carcass band drum 52, for example, a bladder 94 is actuated to toroidally expand the cylindrical carcass band 80 under the movement of the bead lock 92 and the bead core 86 approaching to each other as shown in FIG. 24e.

Figure 26:
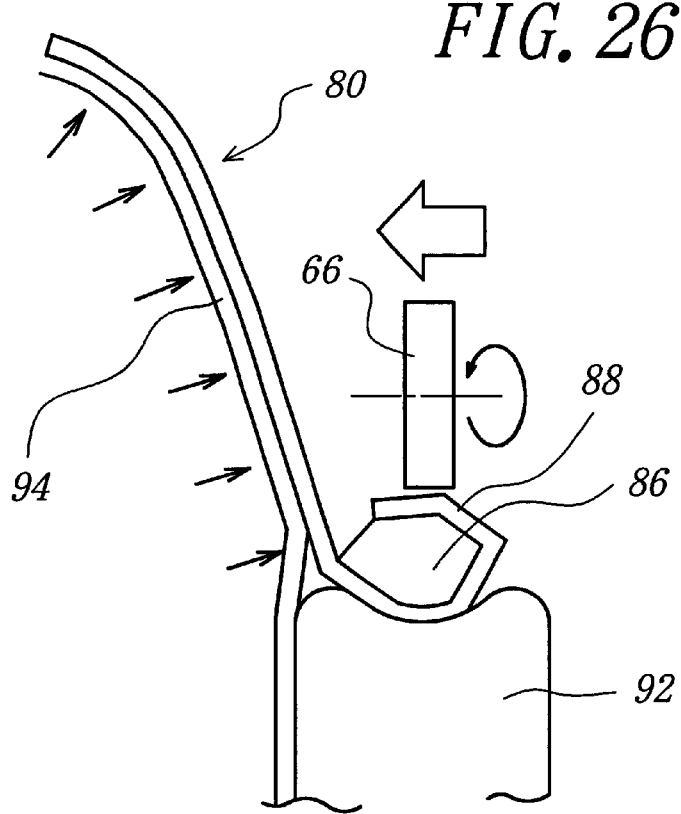
FIG. 26 is a diagrammatically enlarged section view illustrating a stitching state.

After the shape of the carcass band 80 including the bent end portion 88 is sufficiently closed to a shape of a built green tire and hence a product tire by toroidally expanding the carcass band 80, as enlargedly shown in FIG. 26, the bent end portion 88 is subjected to stitching through stitcher roll 66 to more press the whole of the bent end portion 88 onto the peripheral surface of the bead core 86, whereby the bent end portion 88 is accurately wound around the peripheral surface of the bead core 86 to ensure a high tensile strength in the carcass band 80.

Prior to the expansion deformation of the carcass band 80, the O-ring 60 shown in FIG. 20 is previously moved to a given position on the outer periphery of the carcass band drum 52 at a state of holding the BT band, whereby the BT band can be joined to the outer peripheral surface of the carcass band 80 accompanied with the expansion deformation of the carcass band.

After the completion of a series of the above works, the conventional general works are continued up to the completion of green tire building.

Figure 27:
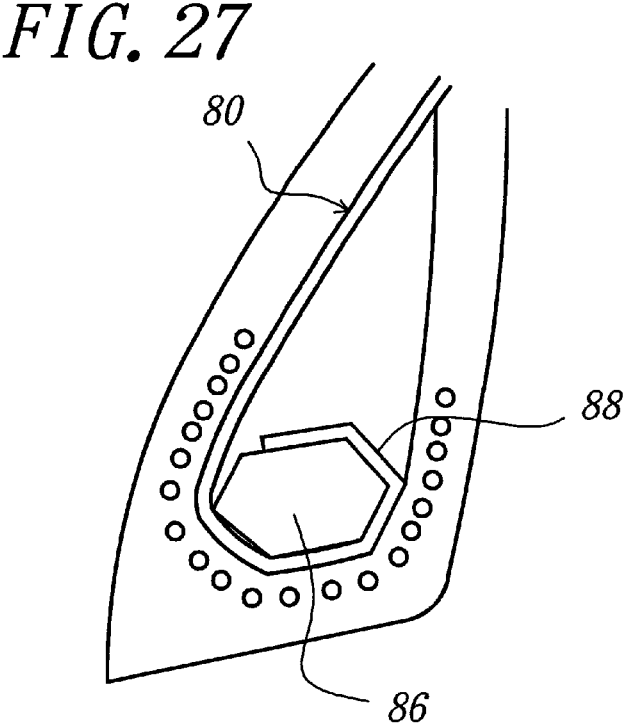
FIG. 27 is a diagrammatically section view illustrating a structure of a bead portion in a product tire after vulcanization.

In FIG. 27 is shown an embodiment of a bead portion structure after the thus obtained green tire is subjected to tire building through vulcanization, from which it is clear that the bent end portion 88 is accurately wound around the bead core 23 based on the fact that the bent end portion is previously formed in the carcass band 80 accompanied with the plastic deformation and such a winding posture can surely be maintained up to the completion of the tire building through vulcanization.

Figure 28:
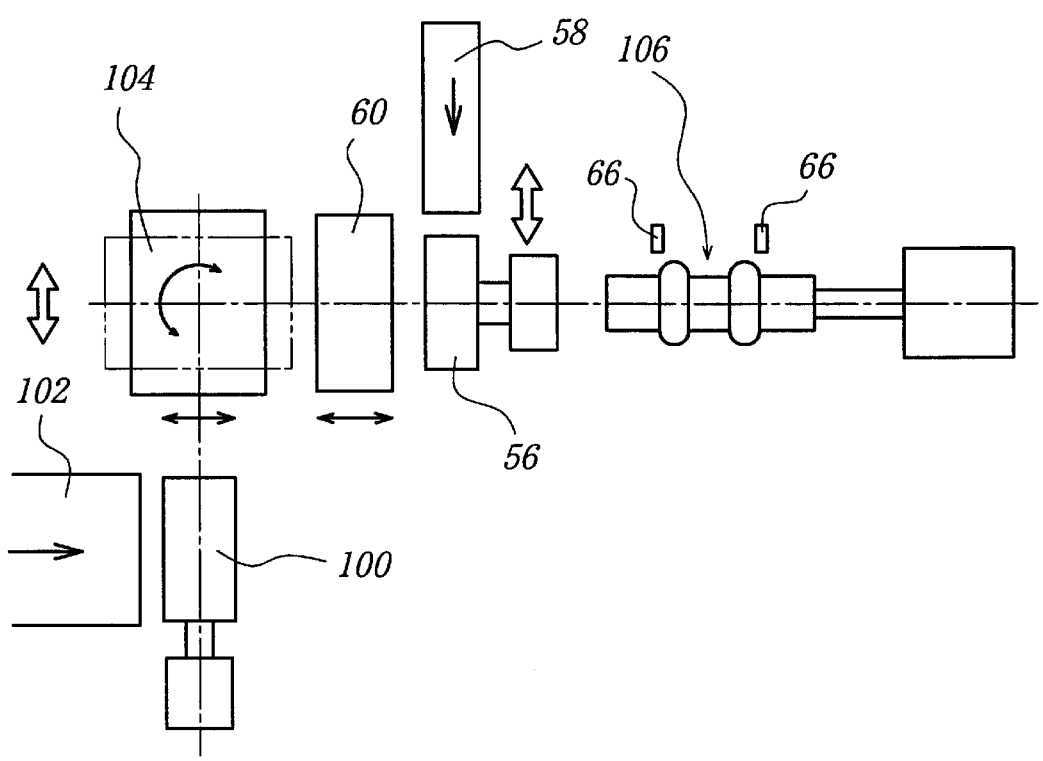
FIG. 28 is a schematically plan view illustrating another embodiment of the tire manufacturing apparatus according to the invention.

In FIG. 28 is shown another embodiment of the tire manufacturing apparatus according to the invention, wherein numeral 100 is a carcass band drum conducting only the formation of the cylindrical carcass band, and numeral 102 a servicer feeding a carcass ply to the carcass band drum 100.

Numeral 104 is a transporting means of the cylindrical carcass band 80, which acts to receive the cylindrical band 80 formed on the carcass band drum 100 and transport it into a shaping drum mentioned later. And also, the transporting means 104 acts to form the bend end portion 88 of the carcass band 80 together with the carcass band bending apparatus 64 and the bead setter 62 (not shown) attached thereto and insert the bead core 86 into the inside of the bent end portion 88.

Numeral 106 is a shaping drum provided with a shaping means. In the shaping drum 106, an innerliner, a sidewall, a wire chafer and the like are wound and laminated and shaped together with the carcass band 80.

Moreover, the BT drum 56, the O-ring 60 and so on have substantially the same actions as mentioned above.

In the manufacture of the tire using the above apparatus, the carcass ply fed from the servicer 102 is wound around the carcass band drum 100 to form the cylindrical carcass band 80 as shown in FIG. 29*a*, while the carcass band 80 is received by the transporting means 104, at where the bent end portion 88 is formed on the end portion of the carcass band 80 by the carcass band bending apparatus 64 as shown in FIG. 29*b* and the bead core 86 is inserted into the inside of the bent end portion 88 by the bead setters 62.

On the other hand, the innerliner, sidewall, wire chafer and so on are previously wound and shaped on the shaping drum 106 as shown in FIG. 29*c*, and the carcass band 80 including the bead core 86 as mentioned above is transported and positioned onto an outer peripheral side thereof by the transporting means 104 as shown in FIG. 29*d*, and thereafter the shaping drum 106 is enlarged to a given outer diameter enough to hold the cylindrical carcass band 80 from the inner peripheral side.

Thereafter, the bead lock 92 is actuated to hold the bead core 86 from its inner peripheral side, while a bladder 94 as a shaping means is expanded to toroidally expand and deform the carcass band 80 and the bent end portion 88 is subjected to stitching through stitcher rolls 66 under such a state.

In this case, the BT band formed by the BT drum 56 and held by the O-ring 60 is positioned at the outer peripheral side of the carcass band 80 prior to the expansion deformation of the carcass band 80, whereby the BT band is joined to the outer peripheral surface of the carcass band 80 accompanied with the expansion deformation of the carcass band.

In the pneumatic tire manufactured through the above steps, the bent end portion 88 accurately wound on the peripheral surface of the bead core 86 is previously formed on the end portion of the cylindrical carcass band 80, so that the winding posture as shown in FIG. 27 can surely be maintained even after the completion of the tire building through vulcanization.

The following examples are given in illustration of the invention and are not intended as limitations thereof.

EXAMPLES 1–9, CONVENTIONAL EXAMPLES 1–2

There are provided pneumatic radial tires for truck and bus having a tire size of 285/60R22.5, which are mounted onto a rim of 9.00×22.5, respectively. Then, the pulling-out of carcass ply cord, durability through drum test, heat build-up temperature of bead portion and tire weight are measured to obtain results as shown in Table 1.

These tires have a bead portion structure and details thereof as shown in Table 1, respectively.

The pulling-out of carcass ply cord is evaluated by three stages of symbol ⊙ (no pulling-out), symbol ○ (moving a part of carcass ply cords but not pulling out) and symbol X (occurrence of pulling-out) after the presence or absence of the cord pulling-out is examined by supplying water pressure of 60 kgf/cm$^2$ to the inside of the tire mounted onto the rim.

The durability on drum is evaluated by a drum test that the tire mounted onto the recommended rim and inflated under the maximum air pressure is run on a drum under a load corresponding to 2 times the maximum load capacity to measure a running distance until the running is impossible due to the occurrence of bead portion trouble (separation at the turnup end of carcass ply or at the end of wire chafer), crack in bead filler or the like and represented by an index on the basis that Conventional Example 1 is 100, wherein the larger the index value, the better the durability.

The heat build-up temperature of bead portion is evaluated by measuring a temperature near to the turnup end of the carcass ply by means of a thermocouple previously embedded in the vicinity of the turnup end after 2 hours in the running on the drum and represented by an index on the basis that Conventional Example 1 is 100, wherein the smaller the index value, the better the property.

Further, the tire weight is represented by an index on the basis that Conventional Example 1 is 100, wherein the smaller the index value, the lighter the weight.

TABLE 1

Figure 1A:
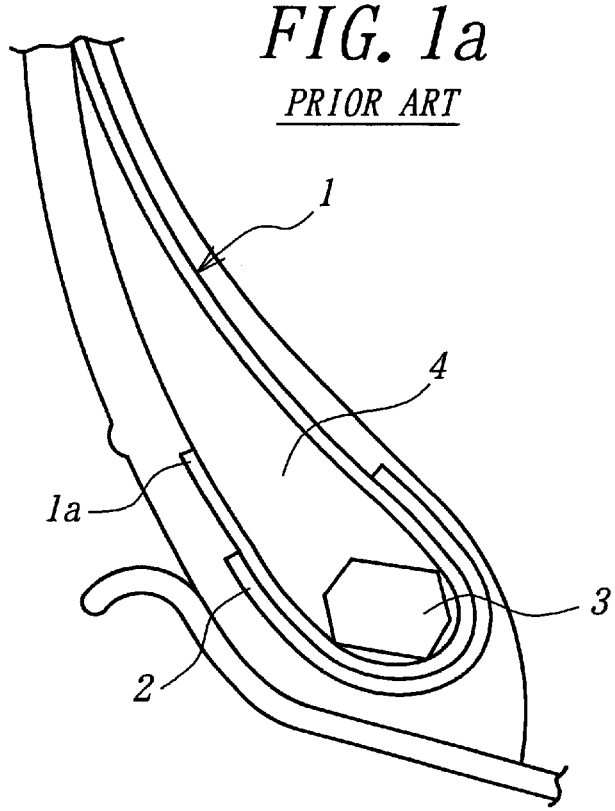
FIGS. 1a and 1b are diagrammatically partial section views illustrating embodiments of a bead portion structure in the conventional tire.
Figure 1B:
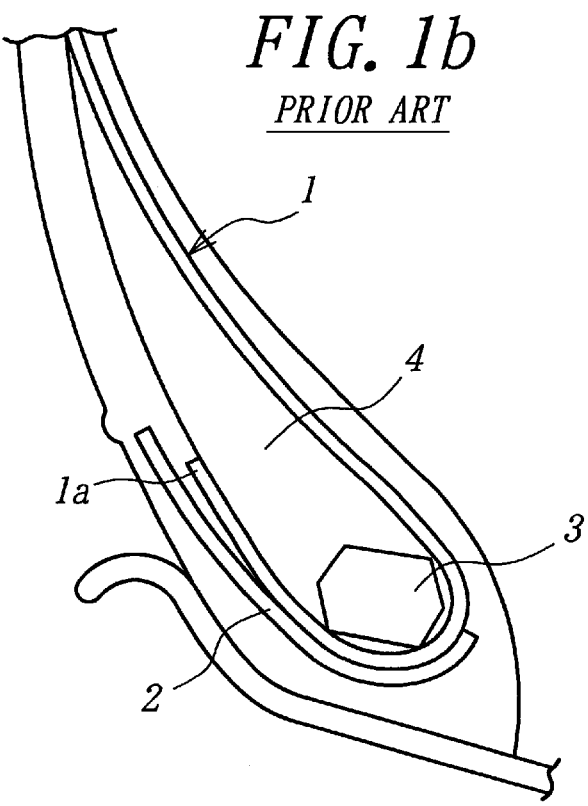
Figure 2A:
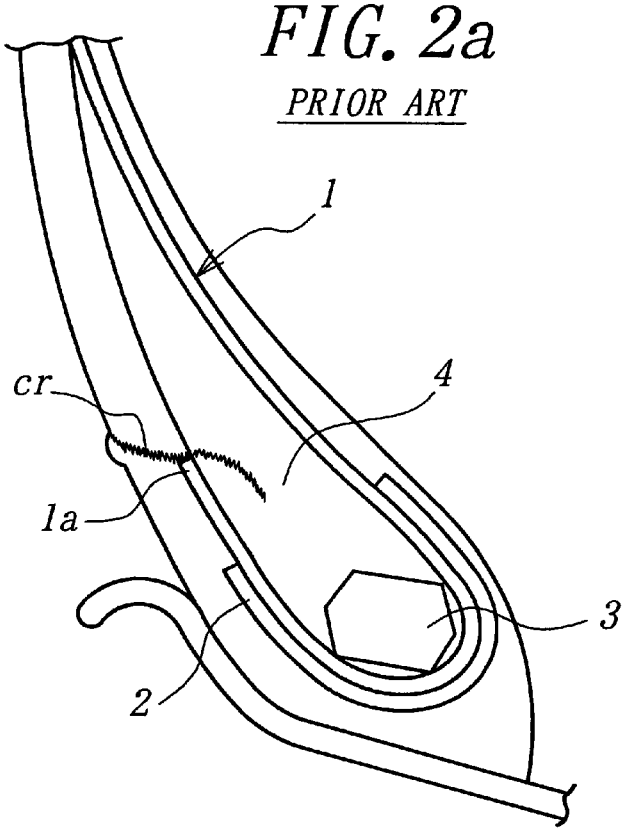
FIGS. 2a and 2b are diagrammatically partial section views illustrating the occurrence of crack in the bead portion shown in FIGS. 1a and 1b.
Figure 2B:
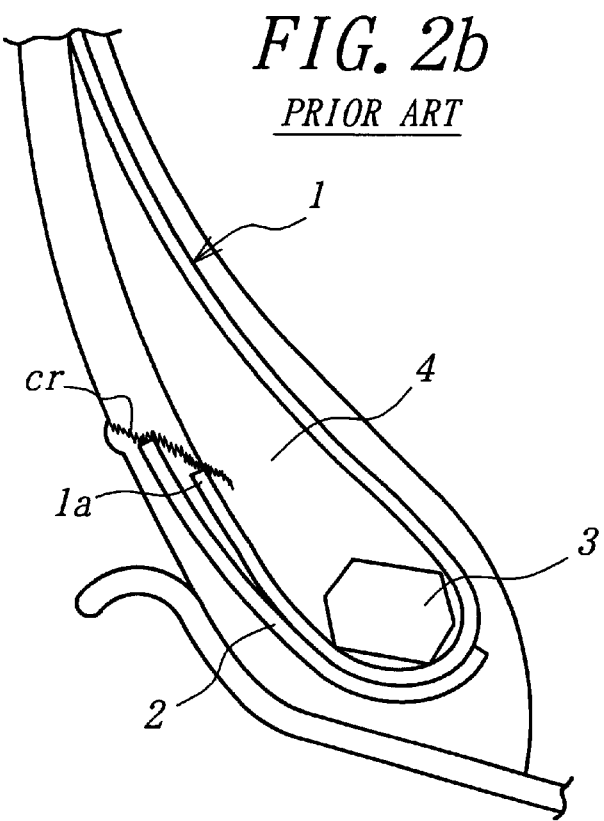
Figure 3:
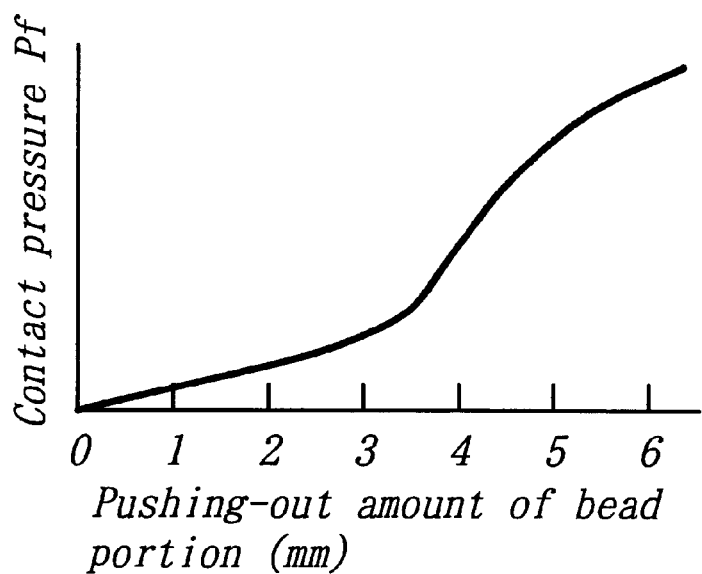
FIG. 3 is a graph showing a relation between a displacement d of a point X on a carcass line when a tire is changed from a deflate state to an inflate state and a contact pressure to a rim flange.

|  | Example 1 | Example 2 | Example 3 | Example 4 | Example 5 | Example 6 | Example 7 | Example 8 | Example 9 | Conventional Example 1 | Conventional Example 2 |
|---|---|---|---|---|---|---|---|---|---|---|---|
| Bead portion structure | FIG. 4 | FIG. 6 | FIG. 9a | FIG. 9b | FIG. 10a | FIG. 10b | FIG. 8 | FIG. 12a | FIG. 12b | FIG. 1a | FIG. 1b |
| Number of carcass plies | 1 | 1 | 1 | 1 | 1 | 1 | 1 | 1 | 1 | 1 | 1 |
| Structure of carcass ply cord | 1 × 27 × 0.18 | 1 × 12 × 0.225 | 1 × 27 × 0.18 | 1 × 27 × 0.18 | 1 × 27 × 0.18 | 1 × 12 × 0.225 | 1 × 12 × 0.225 | 1 × 12 × 0.225 | 1 × 12 × 0.225 | 1 × 12 × 0.225 | 1 × 12 × 0.225 |
| Sectional shape of bead core | hexagonal | hexagonal | hexagonal | hexagonal | hexagonal | hexagonal | hexagonal | bead plate + hard rubber | round bead | hexagonal | hexagonal |

TABLE 1-continued

|  | Example 1 | Example 2 | Example 3 | Example 4 | Example 5 | Example 6 | Example 7 | Example 8 | Example 9 | Conventional Example 1 | Conventional Example 2 |
|---|---|---|---|---|---|---|---|---|---|---|---|
| Number of plastic deformation regions | 3 | 3 | 1 | 2 | 4 | 4 | 3 | circle formed | circle formed | none | none |
| Pulling-out of carcass ply cord | ⊚ | ◯ | ◯ | ◯ | ⊚ | ⊚ | ⊚ | ◯ | ⊚ | ⊚ | ◯ |
| Durability on drum (index) | 180 | 140 | 120 | 140 | 180 | 160 | 140 | 130 | 140 | 100 | 90 |
| Heat build-up temperature of bead portion (index) | 85 | 80 | 85 | 85 | 85 | 90 | 90 | 80 | 85 | 100 | 110 |
| Tire weight (index) | 92 | 90 | 94 | 96 | 92 | 94 | 94 | 96 | 94 | 100 | 102 |

EXAMPLES 10–12, COMPARATIVE EXAMPLE 1

There are provided pneumatic radial tires for truck and bus having a tire size of 285/60R22.5 as Examples 10–12. In these tires, the bead portion structure, number of carcass plies, structure of carcass ply cord, sectional shape of bead core, number of plastic deformation regions, displacement d of point X from deflate state to inflate state (mm), radius of curvature $R_0$ at point X at deflate state (mm) and contact pressure Pf of bead portion to rim at inflate state are shown in Table 2. Moreover, the contact pressure Pf is represented by an index on the basis that Conventional Example 1 is 100.

For the comparison, there are provided a tire having a tire structure shown in FIG. 1 as Conventional Example 1, wherein the radius of curvature at point X at deflate state is indefinite (i.e. approximately straight line), and a tire having a tire structure shown in FIG. 4 except that the displacement d exceeds 3 mm as Comparative Example 1.

Each of these tires is mounted onto a rim of 9.00×22.5 and then the pulling-out of carcass ply cord, durability through drum test, heat build-up temperature of bead portion and tire weight are measured in the same manner as described in Example 1 and the amount of permanent set in fatigue of bead portion is measured by the following test method to obtain results as shown in Table 2.

Figure 30A:
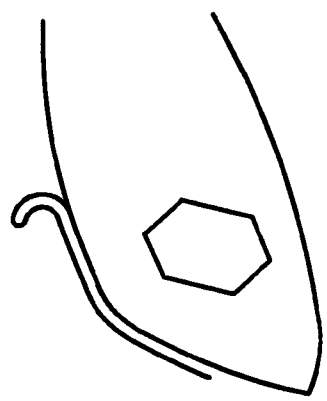
FIGS. 30a and 30b are diagrammatically section views of bead portion in a new tire and last use stage for illustrating amount of permanent set in fatigue of bead portion.
Figure 30B:
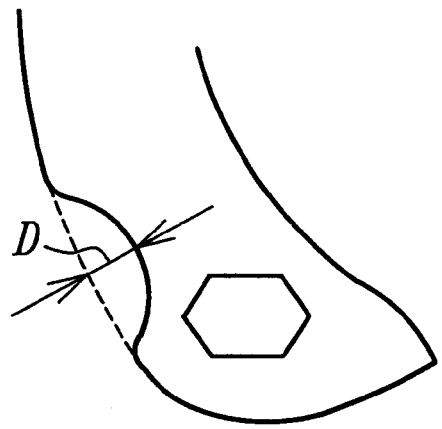

The amount of permanent set in fatigue of bead portion D (mm) as shown in FIG. 30b is measured after the tire mounted onto the rim as shown in FIG. 30a is inflated under a maximum air pressure and run on a drum rotating at a speed of 60 km/h under a load corresponding to 1.2 times a maximum load capacity over a distance of 100000 km, wherein the smaller the numerical value, the better the property.

TABLE 2

|  | Example 10 | Example 11 | Example 12 | Conventional Example 1 | Comparative Example 1 |
|---|---|---|---|---|---|
| Bead portion structure | FIG. 4 | FIG. 4 | FIG. 11 | FIG. 12 | corresponding to FIG. 4 |
| Number of carcass plies | 1 | 1 | 1 | 1 | 1 |
| Structure of carcass ply cord | 1 × 27 × 0.18 | 1 × 27 × 0.18 | 1 × 27 × 0.18 | 1 × 12 × 0.225 | 1 × 27 × 0.18 |
| Sectional shape of bead cord | hexagonal | hexagonal | hexagonal | hexagonal | hexagonal |
| Number of plastic deformation regions | 3 | 3 | 3 | none | 3 |
| Displacement d of point X*1 (mm) | 2.8 | 1.0 | 0 | 6.0 | 4.5 |
| Radius of curvature $R_0$ at point X*2 | 250 | 140 | 80 | ∞ (approximately straight) | 400 |
| Contact pressure Pf of bead portion to run | 80 | 55 | 20 | 100 | 95 |
| Pulling-out of carcass ply cord | ⊚ | ⊚ | ⊚ | ⊚ | ⊚ |
| Durability on drum (index) | 180 | 180 | 170 | 100 | 180 |
| Heat build-up temperature of bead portion (index) | 75 | 70 | 80 | 100 | 85 |
| Tire weight (index) | 88 | 86 | 88 | 100 | 92 |
| Amount of permanent set in fatigue of bead portion (mm) | 2.1 | 1.7 | 1.2 | 4.2 | 3.6 |

*1 change of deflate state to inflate state
*2 at deflate state

As seen from Table 2, the tires of Examples 10–12 are equal to or more than the tire of Conventional Example 1 in the pulling-out of carcass ply cord, durability on drum, heat build-up temperature of bead portion and amount of permanent set in fatigue of bead portion and the tire weight is largely reduced.

EXAMPLE 13

Figure 31:
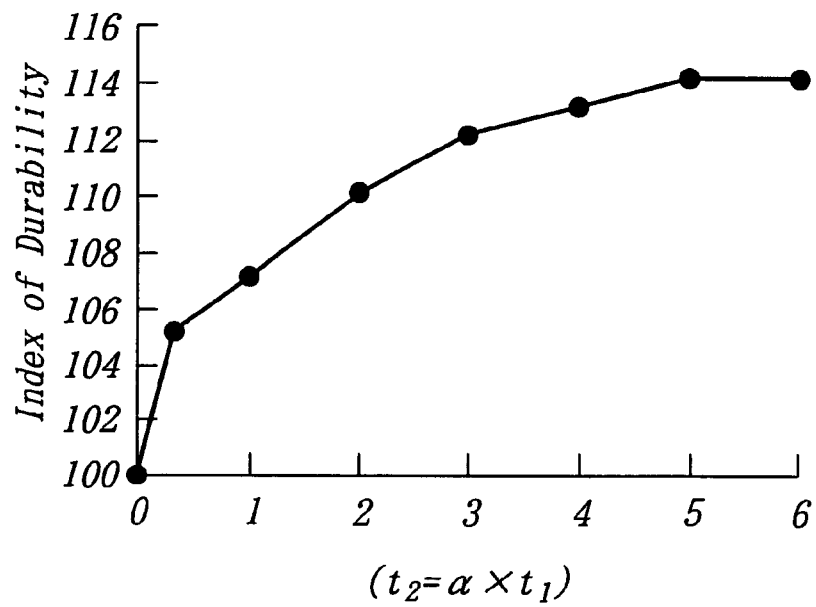
FIG. 31 is a graph showing a relation between thickness of rubber layer and index of bead portion durability.
Figure 32:
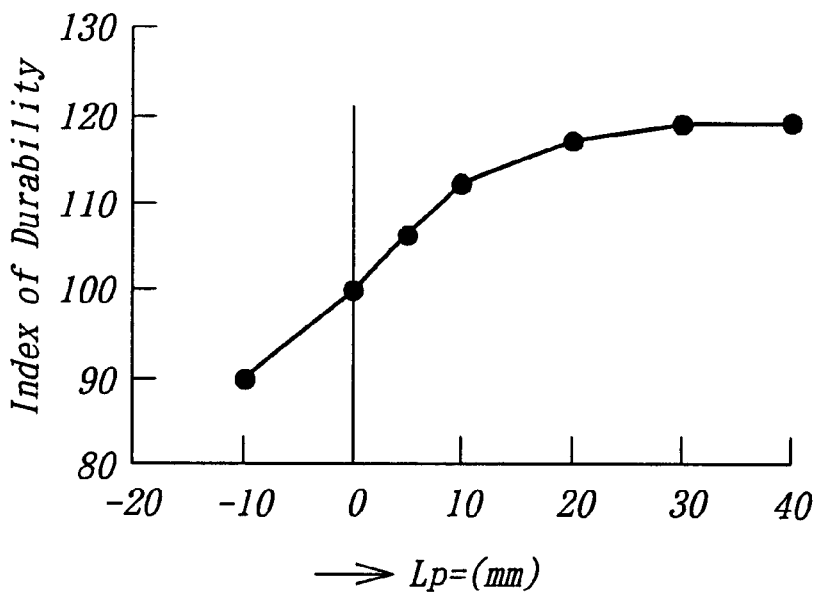
FIG. 32 is a graph showing a relation between protruding length of rubber layer from bead portion reinforcing layer and index of bead portion durability.

In this example, bead portion durability is measured with respect to thickness $t_2$ of rubber layer 35, thickness $t_1$ of bead portion reinforcing layer 34 and protruding length $L_P$ of rubber layer 35 from bead portion reinforcing layer 34 shown in FIG. 13 to obtain results as shown in FIGS. 31 and 32. In this case, a drum test is carried out by mounting a test tire having a tire size of 285/60R22.5 onto a rim of 9.0×22.5R and running on the drum at an internal pressure of 882 kPa under a load of 49.0 N.

In FIG. 31, the bead portion durability is represented by an index on the basis that the thickness $t_1=0$ of the bead portion reinforcing layer 34 is 100. As seen from FIG. 31, the effect of improving the durability is developed when $t_2$ is not less than $0.3t_1$, while when $t_2$ exceeds $5t_1$, the more improving effect is not observed and there is rather a demerit of increasing the production cost and the tire weight. As a result, the thickness $t_2$ of the rubber layer 35 is restricted to $0.3t_1 \leq t_2 \leq 5t_1$ in the invention.

In FIG. 32, the bead portion durability is represented by an index on the basis that the protruding length $L_P=0$ mm is 100. As seen from FIG. 32, when a part of the rubber layer 35 is protruded from the end of the bead portion reinforcing layer 34, the improving effect is developed, while when the protruding length $L_P$ exceeds 30 mm, the improving effect is saturated and there is rather a demerit of increasing the production cost and the tire weight. As a result, the protruding length $L_P$ of the rubber layer 35 from the bead portion reinforcing layer 34 is 30 mm at maximum in the invention.

In this connection, there are provided a tire shown in FIG. 14 (JIS hardness of A-portion: 82°, JIS hardness of C-portion: 38°, $t_1$: 1.0 mm), a tire shown in FIG. 13 (JIS hardness of A-portion: 82°, JIS hardness of B-portion: 60°, JIS hardness of C-portion: 38°, $t_1$: 1.0 mm, $t_2$: 2.4 mm, $L_P$: 28 mm) and a tire shown in FIG. 15 (JIS hardness of A-portion: 63°, JIS hardness of B-portion: 38°, JIS hardness of C-portion: 71°, JIS hardness of D-portion: 82°, $t_1$: 1.0 mm, $t_2$: 2.4 mm, $L_P$: 28 mm), a tire size of which tires is 285/60R22.5. Each of these tires is mounted onto a rim of 9.0×22.5R and run on a drum at an internal pressure of 882 kPa under a load of 49.0 kN to measure a distance until the running is made impossible due to the occurrence of separation failure in the bead portion.

When the running distance is represented by an index on the basis that the conventional tire shown in FIG. 14 is 100, the index value of the tire shown in FIG. 13 is 125, and the index value of the tire shown in FIG. 15 is 135. From these facts, it has been confirmed that the bead portion durability is considerably improved in the tires according to the invention.

EXAMPLES 14–16

There are provided four tires having a tire size of 285/60R22.5, wherein a tire of Example 14 is a tire having a structure shown in FIG. 16, a tire of Example 15 is a tire having a structure shown in FIG. 18 a tire of Example 16 is a tire having a structure shown in FIG. 19, and a conventional tire has a structure having no recess zone 40 and wrap part 17 as shown in FIG. 1a.

In these tires, the carcass ply 15 is a rubberized ply containing steel cords of (1×3+9+15)×0.175 mm+1×0.15 mm arranged side by side at an end count of 26 cords/5 cm (measured around the bead core) and extending substantially in a radial direction. And also, the bead portion reinforcing layer 18 is a rubberized layer containing steel cords of (1×3+9+15)×0.175 mm+1×0.15 mm arranged side by side at an end count of 21 cords/5 cm (measured around the bead core) and inclined at a cord angle of 60° with respect to the radial direction (measured at an outer end portion in the axial direction of the tire).

Moreover, the ratio $W_P/W_M$ is 0.88 in the tire of Example 14, 0.85 in the tire of Example 15, and 0.92 in the tire of Example 16, respectively.

Each of these tires inflated under an internal pressure of 900 kPa is run on a steel drum having a radius of 1.7 m at a speed of 60 km/h under a load of 5200 kg to measure a running distance until the occurrence of trouble in bead portion (separation failure). In this case, a measuring temperature is 46° C.

The bead portion durability is evaluated by an index on the basis that the running distance until the occurrence of bead portion trouble in the conventional tire is 100, wherein the larger the index value, the better the durability.: The results are shown in Table 3.

TABLE 3

| | Conventional tire | Example 14 | Example 15 | Example 16 |
|---|---|---|---|---|
| Bead portion durability (index) | 100 | 120 | 127 | 138 |

As seen from Table 3, the bead portion durability in the tires of Examples 14–16 is largely improved as compared with that of the conventional tire. This shows that the tire according to the invention is suitable for use in a base tire for recapping. And also, the tire of Example 16 is less in the fall-down deformation of the bead portion under loading as compared with the tires of Examples 14 and 15 because the ratio $W_P/W_M$ is set to a value larger than 0.9.

As mentioned above, according to the invention, the wrap part wrapping around the bead core along the peripheral surface thereof is formed in the turnup portion of the carcass ply, whereby the pulling-out of the carcass ply cord and separation failure in the turnup portion of the carcass ply can effectively be prevented and the bead portion durability can largely be improved. And also, the heat build-up of the bead portion and the tire weight can advantageously be reduced.

And also, according to the invention, the bent end portion is formed on the end portion of the cylindrical carcass band and the bead core is inserted into the bent end portion, whereby the bent end portion can accurately be wound on the peripheral surface of the bead core even when cords having a large elastic restoring force such as steel cords and so on are used as a cord in the carcass ply and the winding posture can surely be maintained even after the tire building through vulcanization. As a result, the separation failure at the turnup end of the carcass ply is sufficiently prevented and the fear of pulling out the cord of the carcass ply can sufficiently be removed.

What is claimed is:

1. In a pneumatic tire comprising a carcass comprised of at least one carcass ply containing a steel cord(s) arranged at a cord angle of 70–90° with respect to an equatorial plane of the tire and toroidally extending between a pair of bead cores and turned up around the bead core from an inside toward an outside in a radial direction to form a turnup portion, the improvement wherein a wrap part wrapping on a peripheral face of the bead core therealong is formed in the turnup portion of the carcass ply and at least one plastic deformation region is formed in the wrap part.

2. A pneumatic tire according to claim 1, wherein at least one plastic deformation region is previously formed in a portion of the carcass ply corresponding to the wrap part prior to the winding of the carcass ply around the bead core.

3. A pneumatic tire according to claim 2, wherein the plastic deformation region is formed in a portion of the carcass ply corresponding to the warp part prior to the winding of the carcass ply around the bead core.

4. A pneumatic tire according to claim 1, wherein at least the wrap part of the turnup portion is interposed between the bead core and a bead filler.

5. A pneumatic tire according to claim 1, wherein the wrap part is extended along the peripheral face of the bead core over a half periphery of the sectional profile of the bead core.

6. A pneumatic tire according to claim 1, wherein an outer end of the turnup portion is located inward from an outer circumferential edge of a bead portion at a contact region with a rim flange in the radial direction of the tire.

7. A pneumatic tire according to claim 1, wherein the end of the wrap part is located inside in the radial direction over a position corresponding to an outer peripheral edge of a bead core embedded in a bead portion at a state of mounting onto a rim in the inflation under a maximum air pressure.

8. A pneumatic tire according to claim 1, wherein the tire has an aspect ratio of not more than 60%.

9. A pneumatic tire according to claim 1, wherein the steel cord has a tenacity of 80–300 kgf.

10. A method of manufacturing a pneumatic tire as claimed in anyone of claims 1 to 9, which comprises subjecting a cylindrical carcass band to a forming treatment by bending each end portion of the band in at least one place in an axial direction of a green tire over a full circumference thereof inward or outward in a radial direction of the tire, arranging a ring-shaped bead core on an inside of the bent end portion, toroidally expanding the cylindrical carcass band while locking the bead core, and then joining a belt and a tread onto an outer peripheral side of the carcass band.

11. An apparatus for bending a carcass band for use in the manufacture of the pneumatic tire, comprising a shaft-shaped member provided with at least one annular groove supporting an end portion of a cylindrical carcass band form an inner circumferential side thereof, and at least one disc-shaped member located in position corresponding to the annular groove, and pushing the cylindrical carcass band into the annular groove.

12. In a pneumatic tire comprising a carcass comprised of at least one carcass ply containing a steel cord(s) arranged at a cord angle of 70–90° with respect to an equatorial plane of the tire and toroidally extending between a pair of bead cores and turned up around the bead core from an inside toward an outside in a radial direction to form a turnup portion, the improvement wherein a wrap part wrapping on a peripheral face of the bead core therealong is formed in the turnup portion of the carcass ply; and wherein the end of the wrap part is located inside in the radial direction over a position corresponding to an outer peripheral edge of a bead core embedded in a bead portion at a state of mounting onto a rim in the inflation under a maximum air pressure.

13. In a pneumatic tire comprising a carcass comprised of at least one carcass ply containing a steel cord(s) arranged at a cord angle of 70–90° with respect to an equatorial plane of the tire and toroidally extending between a pair of bead cores and turned up around the bead core from an inside toward an outside in a radial direction to form a turnup portion, the improvement wherein a wrap part wrapping on a peripheral face of the bead core therealong is formed in the turnup portion of the carcass ply; and wherein the tire has an aspect ratio of not more than 60%.

* * * * *